United States Patent
Kowaki et al.

(10) Patent No.: US 7,759,430 B2
(45) Date of Patent: *Jul. 20, 2010

(54) FLAME RETARDANT POLYESTER FIBER FOR ARTIFICIAL HAIR

(75) Inventors: Toshihiro Kowaki, Osaka (JP); Toshiyuki Masuda, Hyogo (JP); Hiroyuki Shinbayashi, Osaka (JP); Toyohiko Shiga, Hyogo (JP)

(73) Assignee: Kaneka Corporation, Osaka-shi (JP)

( * ) Notice: Subject to any disclaimer, the term of this patent is extended or adjusted under 35 U.S.C. 154(b) by 913 days.

This patent is subject to a terminal disclaimer.

(21) Appl. No.: 11/345,952

(22) Filed: Feb. 2, 2006

(65) Prior Publication Data

US 2006/0154062 A1    Jul. 13, 2006

Related U.S. Application Data

(63) Continuation-in-part of application No. 10/565,744, filed as application No. PCT/JP2004/010740 on Jul. 20, 2004.

(30) Foreign Application Priority Data

| | | |
|---|---|---|
| Jul. 25, 2003 | (JP) | 2003-201875 |
| Oct. 17, 2003 | (JP) | 2003-358314 |
| Dec. 5, 2003 | (JP) | 2003-408325 |
| Mar. 19, 2004 | (JP) | 2004-081033 |

(51) Int. Cl.
*A41G 5/00* (2006.01)
*C08L 77/00* (2006.01)
*C08L 67/00* (2006.01)
*D01F 11/08* (2006.01)

(52) U.S. Cl. .............. 525/397; 525/408; 525/438; 524/371; 428/364; 428/397; 428/400; 428/401; 132/201; 8/529; 8/532

(58) Field of Classification Search .......... 525/438; 57/253; 132/201; 8/529–534
See application file for complete search history.

(56) References Cited

U.S. PATENT DOCUMENTS

4,506,043 A * 3/1985 Ogawa et al. ............. 523/523

(Continued)

FOREIGN PATENT DOCUMENTS

CN    1075131 C    12/1996

(Continued)

OTHER PUBLICATIONS

International Search Report from Corresponding International Application No. PCT/JP2004/010740 dated Nov. 22, 2004 (4 pages).

(Continued)

*Primary Examiner*—Randy Gulakowski
*Assistant Examiner*—Mike Dollinger
(74) *Attorney, Agent, or Firm*—Westerman, Hattori, Daniels & Adrian, LLP

(57) ABSTRACT

A flame retardant polyester fiber for artificial hair, which is obtained by melt spinning a composition as a mixture of 100 parts by weight of (A) a polyester made of one or more of polyalkylene terephthalate and a copolymer polyester comprising polyalkylene terephthalate as a main component with 5 to 30 parts by weight of (B) a brominated epoxy flame retardant. The present invention also relates to the polyester fiber for artificial hair which has at least one modified cross-section, is a mixture with a fiber having a modified cross-section, and has a mixing ratio of the fiber having a round cross-section to the fiber having a modified cross-section is 8:2 to 1:9, and to the flame retardant polyester fiber for artificial hair which further comprises a hydrophilic fiber treating agent attached thereto, and thus has excellent smooth feeling, combing properties, and flame retardance.

24 Claims, 4 Drawing Sheets

U.S. PATENT DOCUMENTS

| | | | |
|---|---|---|---|
| 4,525,404 A * | 6/1985 | Matsui et al. | 428/92 |
| 4,562,216 A * | 12/1985 | Kishida et al. | 523/433 |
| 4,732,921 A * | 3/1988 | Hochberg et al. | 523/460 |
| 5,083,967 A * | 1/1992 | Yokoe et al. | 446/394 |
| 5,474,839 A * | 12/1995 | Ogawa et al. | 442/80 |
| 5,614,568 A * | 3/1997 | Mawatari et al. | 523/122 |
| 5,954,062 A | 9/1999 | Murata | |
| 7,332,563 B2 * | 2/2008 | Masuda et al. | 528/308.1 |
| 2006/0194044 A1 | 8/2006 | Kowaki et al. | |

FOREIGN PATENT DOCUMENTS

| | | |
|---|---|---|
| CN | 1221583 | 7/1999 |
| CN | 1337489 | 2/2002 |
| JP | 48-13277 | 2/1973 |
| JP | 60-071713 A | 4/1985 |
| JP | 62-170519 A | 7/1987 |
| JP | 3-124761 A | 5/1991 |
| JP | 5-86505 A | 4/1993 |
| JP | 8-19568 B2 | 2/1996 |
| KR | 1982-0001211 B1 | 7/1982 |
| KR | 1998-084288 | 12/1998 |
| KR | 1999-0040635 | 5/1999 |
| KR | 10-0215251 B1 | 8/1999 |
| KR | 2004-61347 | 7/2004 |
| WO | WO 03071014 A1 * | 8/2003 |

OTHER PUBLICATIONS

"Studies on New Hydrophilic Finishing Agent for Fabrics," Journal of Qiqiha'er Institute of Light Industry, vol. 4, Aug. 31, 1988, 11 pages. (Partial Translation).

Office Action for Corresponding Chinese Patent Application No. 2004800210767 dated Aug. 17, 2007, 5 pages.

International Preliminary Report on Patentability (Chapter 1 of the Patent Cooperation Treaty) from Corresponding International Application No. PCT/JP2004/010740, dated May 22, 2006.

* cited by examiner

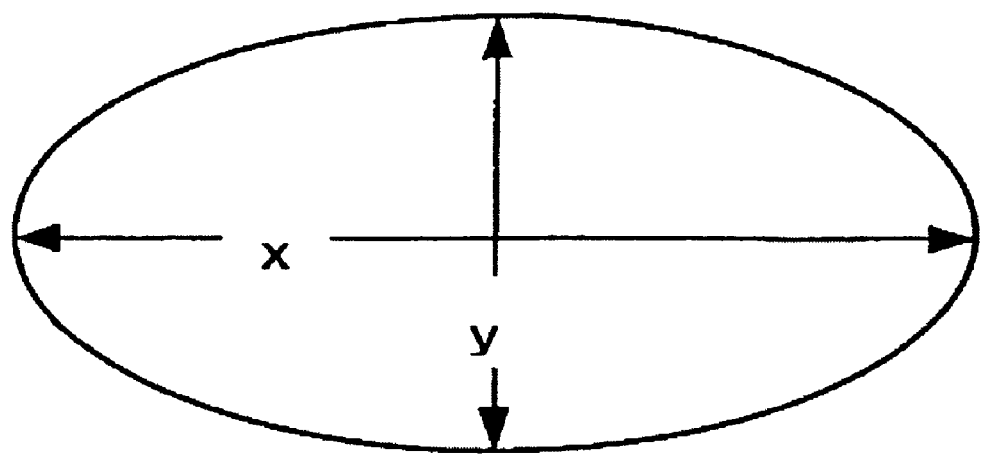
FIG.7
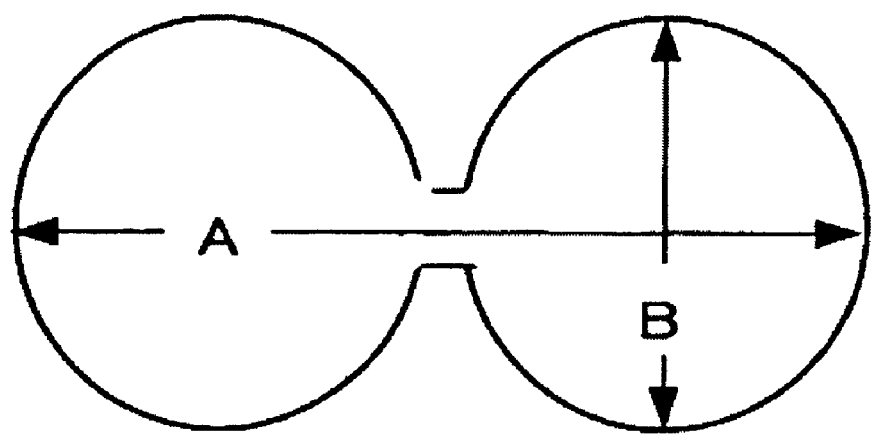
FIG.8
FIG.9
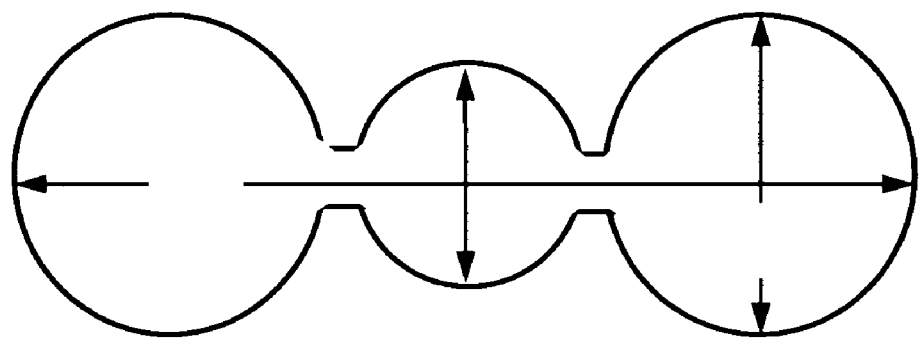

FLAME RETARDANT POLYESTER FIBER FOR ARTIFICIAL HAIR

RELATED APPLICATIONS

This application is a continuation-in-part of parent application Ser. No. 10/565,744), filed Jan. 23, 2006, and entitled FLAME-RETARDANT POLYESTER FIBERS FOR ARTIFICIAL HAIR, and claims priority therefrom. The latter is a nationalization of PCT application PCT/JP2004/010740 filed on Jul. 20, 2004, claiming priority based on Japanese Patent Application No. 2003-201875 (Jul. 25, 2003), Japanese Patent Application No. 2003-358314 (Oct. 17, 2003), Japanese Patent Application No. 2003-408325 (Dec. 5, 2003) and Japanese Patent Application No. 2004-081033 (Mar. 19, 2004). The contents of the PCT application, the parent application and the Japanese priority applications are incorporated hereby by reference, in their entirety.

TECHNICAL FIELD

The present invention relates to a flame retardant polyester fiber for artificial hair, made of a polyester and a brominated epoxy flame retardant. More particularly, the present invention relates to a fiber for artificial hair which maintains fiber properties such as flame resistance, heat resistance, and strength and elongation, and has excellent curl-setting properties, transparence, devitrification resistance, and combing properties.

The present invention also relates to a modified cross-section fiber. More particularly, the present invention relates to a modified cross-section fiber having luster, hue, texture and bulkiness close to human hair, which is used as a fiber for artificial hair for hair goods or the like such as wig, braid, or extension hair, and to a fiber for artificial hair using the modified cross-section fiber.

Furthermore, the present invention relates to a fiber for artificial hair which has excellent smooth feeling, combing properties, and antistatic properties.

BACKGROUND ART

Fibers made of polyethylene terephthalate or a polyester comprising polyethylene terephthalate as a main component has excellent heat resistance, chemical resistance, a high melting point and a high modulus of elasticity, therefore are thus widely used in curtains, carpets, clothes, blankets, sheetings, table clothes, upholstery fabrics, wall coverings, artificial hair, interior materials for automobiles, outdoor reinforcing materials, and safety nets.

On the other hand, human hair, artificial hair (modacrylic fibers, polyvinyl chloride fibers), or the like has been conventionally used in hair products such as wigs, hair wigs, extensions, hair bands, and doll hair. However, it has now become difficult to provide human hair for hair products, and thus artificial hair has become more important. Modacrylic fibers have been often used as artificial hair materials due to their flame retardance, but have only insufficient heat resistance.

In recent years, there has been proposed artificial hair using, as a main component, a polyester typified by polyethylene terephthalate having excellent heat resistance. However, fibers made of a polyester typified by polyethylene terephthalate are flammable materials, and thus have insufficient flame resistance.

Conventionally, various attempts have been made to improve flame resistance of polyester fibers. Known examples of such attempts include a method comprising using a fiber made of a polyester obtained by copolymerizing a flame retardant monomer containing a phosphorus atom, and a method comprising adding a flame retardant to a polyester fiber.

As the former method comprising copolymerizing a flame retardant monomer, a method comprising copolymerizing a phosphorus compound with excellent heat stability having a phosphorus atom as a ring member (Japanese Patent Publication No. 55-41610), a method comprising copolymerizing carboxyphosphinic acid (Japanese Patent Publication No. 53-13479), a method comprising copolymerizing a polyester containing a polyallylate with a phosphorus compound (Japanese Patent Laid-open No. 11-124732), or the like has been proposed.

As artificial hair to which the above flame retardant technology is applied, a polyester fiber copolymerized with a phosphorus compound has been proposed (Japanese Patent Laid-open No. 03-27105, Japanese Patent Laid-open No. 05-339805, etc.), for example.

However, since artificial hair is demanded to be highly flame resistant, such a copolymer polyester fiber must have a high copolymerization amount when used for artificial hair. This results in a significant decrease in flame resistance of the polyester, and causes other problems in which it is difficult to perform melt spinning, or, when flame approaches, the artificial hair does not catch fire and is not burned, but molten and dripped. When the phosphorus flame retardant is added, stickiness is increased because it must be added in a large amount to exhibit flame retardance, and the resulting artificial hair made of a polyester fiber tends to have a heat history and, under high humidity conditions, be devitrified to affect the appearance of the fiber.

On the other hand, as the latter method comprising adding a flame retardant, a method comprising adding a halogenated cycloalkane compound as fine particles to a polyester fiber (Japanese Patent Publication No. 03-57990), a method comprising adding a bromine-containing alkylcyclohexane to a polyester fiber (Japanese Patent Publication No. 01-24913), or the like has been proposed. However, in the method comprising adding a flame retardant to a polyester fiber, in order to achieve sufficient flame retardance, the addition treatment temperature must be as high as 150° C. or more, the addition treatment time must be long, or a large amount of a flame retardant must be used, disadvantageously. This causes problems such as deteriorated fiber properties, reduced productivity, and an increased production cost.

As described above, artificial hair has not yet been provided which maintains fiber properties possessed by a conventional polyester fiber such as flame resistance, heat resistance, and strength and elongation and has excellent setting properties, devitrification resistance, and stickiness reduction.

Synthetic fibers conventionally used for hair include acrylonitrile fibers, vinyl chloride fibers, vinylidene chloride fibers, polyester fibers, nylon fibers, and polyolefin fibers. Conventionally, these fibers have been processed into products for artificial hair such as wigs, braids, and extension hair. However, these fibers do not have properties necessary for a fiber for artificial hair such as heat resistance, curling properties, and good feeling together. Thus, products with various properties satisfied cannot be produced from a single fiber, and products making use of properties of each fiber are produced and used. Fibers having a cross-section suitable to characteristics of each goods have also been studied and improved.

Examples of such fibers include a filament for wigs having a cocoon cross-section with a length L of a longest part, a diameter W of round parts on both ends, and a width C of a central constriction, each within a specific range (Japanese Utility Model Laid-open No. 48-13277); a synthetic fiber for artificial hair having a largest diameter (L) passing through the gravity in the fiber cross-section within a specific range (Japanese Patent Publication No. 53-6253); a filament for wigs and braids having a Y-shaped cross-section in which four unit filaments having an almost round shape or an elliptical shape are provided with one unit filament radially adjacent to the other three unit filaments at the same intervals, and the adjacent unit filaments have contact points having a width almost equal to the radius of the unit filaments (Japanese Utility Model Laid-open No. 63-78026); and a filament for wigs having a cross-section with at least two flat circles lapped, in which the ratio L/W of the major axis length L to the minor axis length W, the distance between the centers of two adjacent flat circles, the angle between the straight line linking the centers of two adjacent flat circles and the major axes of the flat circles, and the like are limited (Japanese Patent Laid-open No. 55-51802).

However, any of the above-described conventional fibers developed as fibers for artificial hair has a cross-section with a length and an angle extremely limited and with a unique shape, and cannot necessarily easily produced. In addition, such fibers do not necessarily have preferable texture when used for braids or extension hair, and tend to be felt hard because the fibers are intended to keep a hairstyle or make the resulting hair straight. Further, these fibers cannot be sufficiently easily handled manually. Ribbon-section fibers have conventionally widely used for piles, but have been assumed to be inappropriate for use as fibers for artificial hair such as wigs due to their disliked too much softness or the like.

On the other hand, in the method comprising adding a flame retardant to a polyester fiber, in order to achieve sufficient flame retardance, the addition treatment temperature must be as high as 150° C. or higher, the addition treatment time must be long, or a large amount of a flame retardant must be used, disadvantageously. This causes problems such as deteriorated fiber properties, decreased productivity, and an increased production cost.

In order to provide such synthetic fibers poorly flame retardant or not flame retardant with flexibility, smooth feeling, or the like, various silicone finishing agents have been provided. Examples of the finishing agents for providing the fibers with flexibility, crease resistance, elastic force, and compression recovery properties include dimethylpolysiloxane, methylhydrogenpolysiloxane, dimethylpolysiloxane having hydroxyl groups at both terminals, a vinyl group-containing organopolysiloxane, an epoxy group-containing organopolysiloxane, an amino group-containing organopolysiloxane, an ester group-containing organopolysiloxane, and a polyoxyalkylene-containing organopolysiloxane. A treating agent composed of a combination of alkoxysilanes and/or a polyacrylamide resin or a catalyst or the like has also been known.

For example, there is disclosed a method using a treating agent composed of an organopolysiloxane containing at least two epoxy groups in one molecule and an organopolysiloxane containing an amino group, or a treating agent composed of an organopolysiloxane having hydroxyl groups at both terminals, and an organopolysiloxane containing an amino group and an alkoxy group in one molecule and/or its partial hydrolysate and condensate (Japanese Patent Publication No. 53-36079).

Further, there are described a treating agent composed of an organopolysiloxane containing an epoxy group and an aminoalkyltrialkoxysilane (Japanese Patent Publication No. 53-197159 and Japanese Patent Publication No. 53-19716), and a diorganopolysiloxane having triorganosiloxy groups at both terminals, which contains two or more amino groups in one molecule (Japanese Patent Publication No. 53-98499). In addition, there is proposed a method using a treating agent composed of an aminopolysiloxane containing two or more amino groups in one molecule and an alkoxysilane containing one or more reactive groups such as amino groups or epoxy groups (Japanese Patent Publication No. 58-17310).

Further, there are disclosed a method using a treating agent composed of a diorganosiloxane containing at least two amino groups in one molecule and a diorganopolysiloxane containing at least two ester bonds in one molecule (Japanese Patent Laid-open No. 55-152864), and a method using a polysiloxane containing an amino group, a hydroxyl group-terminated polysiloxane, and an alkylalkoxysilane containing a reactive group (Japanese Patent Laid-open No. 58-214585). In addition, there are disclosed a method using a treating agent composed of an organopolysiloxane containing an epoxy group, an aminosilane compound, and a curing catalyst (Japanese Patent Laid-open No. 59-144683), and a method using an organopolysiloxane containing at least two epoxy groups in one molecule and a polyacrylamide resin (Japanese Patent Laid-open No. 60-94680).

However, fibers to which these silicone-containing fiber treating agents are attached exhibit improved smooth feeling, combing properties, and the like, but the silicone-containing fiber treating agents are flammable, and thus provide significantly reduce flame retardance of flame retardant synthetic fibers, disadvantageously.

DISCLOSURE OF THE INVENTION

The present invention relates to a flame retardant polyester fiber for artificial hair, formed from 100 parts by weight of (A) a polyester made of one or more of polyalkylene terephthalate and a copolymer polyester comprising polyalkylene terephthalate as a main component, and 5 to 30 parts by weight of (B) a brominated epoxy flame retardant represented by the general formula (1):

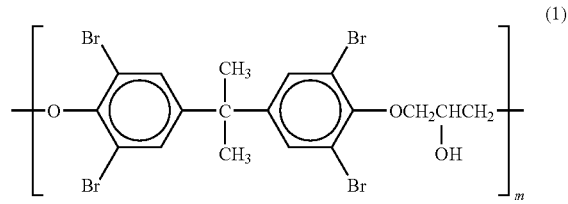

(wherein m represents 0 to 150)

and more preferably the flame retardant polyester fiber for artificial hair, wherein the component (A) is a polyester made of at least one polymer selected from the group consisting of polyethylene terephthalate, polypropylene terephthalate, and polybutylene terephthalate, or the flame retardant polyester fiber for artificial hair, wherein the component (B) is at least one flame retardant selected from the group consisting of brominated epoxy flame retardants represented by the general formulas (α) to (γ)

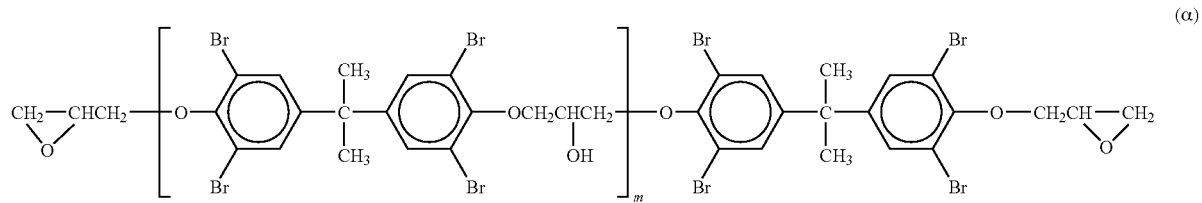

wherein m represents 0 to 150,

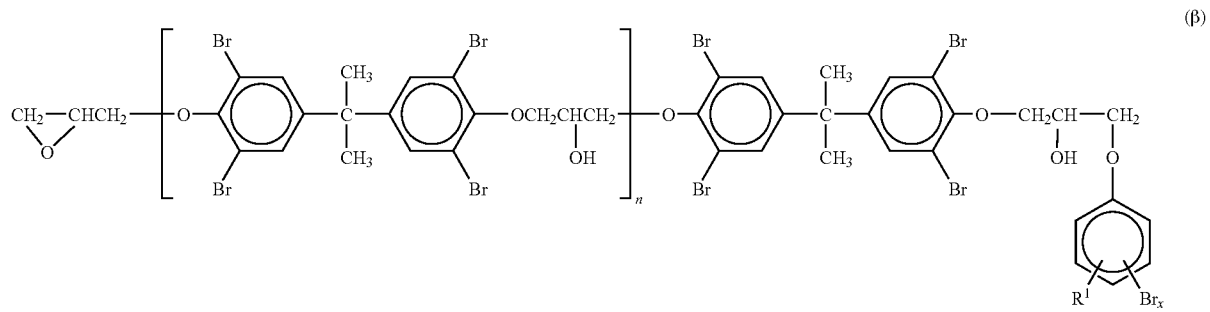

wherein n represents 0 to 150, and wherein $R^1$ represents a $C_{1-10}$ alkyl group, n represents 0 to 150, and x represents 0 to 5,

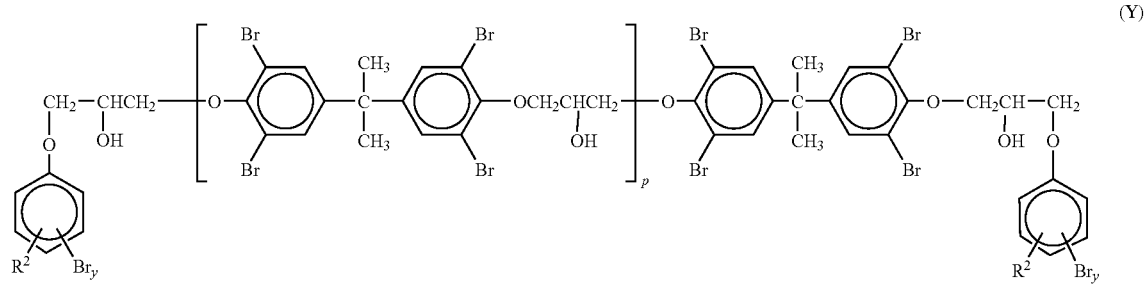

wherein $R^2$ represents a $C_{1-10}$ alkyl group, p represents 0 to 150, and y represents 0 to 5.

Preferably, the present invention relates to the flame retardant polyester fiber for artificial hair, characterized by comprising the components (A) and (B) further mixed with (C) organic fine particles and/or (D) inorganic fine particles to form minute projections on the fiber surface, wherein the component (C) is at least one member selected from the group consisting of a polyallylate, polyamide, fluororesin, silicone resin, crosslinked acrylic resin, and crosslinked polystyrene, or wherein the component (D) is at least one member selected from the group consisting of calcium carbonate, silicon oxide, titanium oxide, aluminum oxide, zinc oxide, talc, kaolin, montmorillonite, bentonite, mica, and an antimony compound.

The present invention also relates to a fiber for artificial hair, comprising the flame retardant polyester fiber to which (E) a hydrophilic fiber treating agent comprising an aliphatic polyether compound as a main component is attached. A flame retardant fiber for artificial hair is thus provided which does not have reduced flame retardance as in the case where a flame retardant polyester fiber, a flame retardant polypropylene fiber, a flame retardant polyamide fiber, or the like is treated with a silicone fiber treating agent in order to improve smooth feeling and texture, for example; has slip feeling, combing properties, and antistatic properties the same as in the case where such a fiber is treated with a silicone oil agent for the same purpose; and has excellent flame retardance.

Further, the polyester fiber of the present invention can have a specific modified cross-section. The present invention further relates to the polyester fiber for artificial hair, which has at least one modified cross-section selected from the group consisting of shapes of an ellipse, crossed circles, a cocoon, a potbelly, a dog bone, a ribbon, three to eight leaves, and a star. The present invention also relates to the polyester fiber for artificial hair, wherein the fiber cross-section has a shape with two or more circles or flat circles lapped or brought into contact with each other. The present invention also relates to the polyester fiber for artificial hair, wherein the fiber cross-section has a shape of three to eight leaves, and the fiber is a modified cross-section fiber having a degree of modification represented by the expression (1) of 1.1 to 8. The present invention further relates to the polyester fiber for artificial hair, wherein the fiber cross-section has a flatness ratio of 1.2 to 4. The present invention still further relates to the polyester fiber for artificial hair, which is a mixture of a fiber having a round cross-section with a fiber having at least one modified cross-section selected from the group consisting of shapes of an ellipse, crossed circles, a cocoon, a potbelly, a dog bone, a ribbon, three to eight leaves, and a star, wherein the mixing ratio of the fiber having a round cross-section to the fiber having a modified cross-section is 8:2 to 1:9.

Preferably, the flame retardant polyester fiber for artificial hair is in the form of a non-crimped fiber, is spun dyed, and has a monofilament size of 30 to 80 dtex.

BRIEF DESCRIPTION OF THE DRAWINGS

FIGS. 1 to 10 are schematic views respectively showing a cross-section of a polyester fiber made of the composition of the present invention, with the figures corresponding to the following:

FIG. 1: A view of a cross-section in the shape of crossed circles

FIG. 2: A view of a cross-section in the shape of crossed flat circles

FIG. 3: A view of a cross-section in the shape of a dog bone

FIG. 4: A view of a cross-section in the shape of three leaves

FIG. 5: A view of a cross-section in the shape of five leaves

FIG. 6: A view of a cross-section in the shape of seven leaves

FIG. 7: A view for describing a flatness ratio of a modified cross-section

FIG. 8: A modified nozzle 1

FIG. 9: A modified nozzle 2

FIG. 10: A modified nozzle 3

BEST MODE FOR CARRYING OUT THE INVENTION

Figure 1:
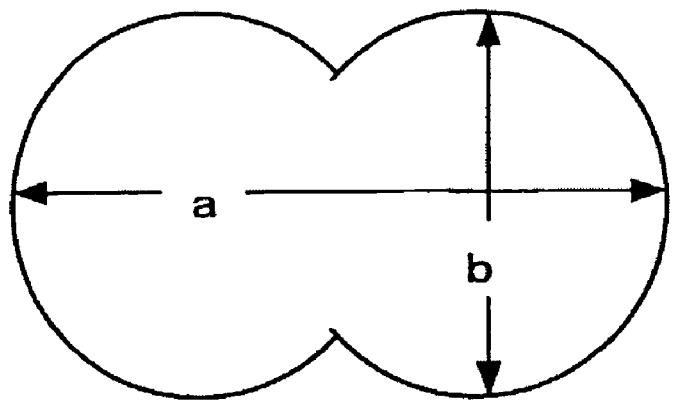

The flame retardant polyester fiber for artificial hair of the present invention is a fiber obtained by melt spinning a composition comprising (A) a polyester made of one or more of polyalkylene terephthalate or a copolymer polyester comprising polyalkylene terephthalate as a main component, and (B) a brominated epoxy flame retardant. Examples of the polyalkylene terephthalate or the copolymer polyester comprising polyalkylene terephthalate as a main component, which is contained in the polyester (A) used in the present invention, include polyalkylene terephthalates such as polyethylene terephthalate, polypropylene terephthalate, and polybutylene terephthalate, and/or a copolymer polyester comprising such polyalkylene terephthalate as a main component and a small amount of a copolymerization component. The phrase "containing as a main component" refers to "containing in an amount of 80 mol % or more".

Examples of the copolymerization component include polycarboxylic acids such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and their derivatives; 5-sodiumsulfoisophthalic acid; dicarboxylic acids including sulfonic acid salts such as dihydroxyethyl 5-sodiumsulfoisophthalate, and their derivatives; 1,2-propanediol, 1,3-propanediol, 1,4-butanediol, 1,6-hexanediol, neopentyl glycol, 1,4-cyclohexanedimethanol, diethylene glycol, polyethylene glycol, trimethylolpropane, pentaerythritol, 4-hydroxybenzoic acid, and ε-caprolactone.

Typically, the copolymer polyester is preferably produced by adding a small amount of a copolymerization component to a main component which is a polymer of terephthalic acid and/or its derivative (for example, methyl terephthalate) and alkylene glycol, and reacting these components, in view of stability and convenience for handling. However, the copolymer polyester may be produced by adding a small amount of a monomer or oligomer component as a copolymerization component to a main component which is a mixture of terephthalic acid and/or its derivative (for example, methyl terephthalate) and alkylene glycol, and polymerizing the components.

The copolymer polyester may be any copolymer polyester in which the copolymerization component is polycondensed with the main chain and/or the side chain of polyalkylene terephthalate as a main component. There are no particular limitations to the manner of polymerization and the like.

Examples of the copolymer polyester comprising polyalkylene terephthalate as a main component include a polyester obtained by copolymerizing polyethylene terephthalate as a main component with ethylene glycol ether of bisphenol A; a polyester obtained by copolymerizing polyethylene terephthalate as a main component with 1,4-cyclohexanedimethanol; and a polyester obtained by copolymerizing polyethylene terephthalate as a main component with dihydroxyethyl 5-sodiumsulfoisophthalate The polyalkylene terephthate and its copolymer polyester may be used singly or in a combination of two or more. Preferable examples thereof include polyethylene terephthalate, polypropylene terephthalate, polybutylene terephthalate, and a copolymer polyester (a polyester obtained by copolymerizing polyethylene terephthalate as a main component with ethylene glycol ether of bisphenol A; a polyester obtained by copolymerizing polyethylene terephthalate as a main component with 1,4-cyclohexanedimethanol; a polyester obtained by copolymerizing polyethylene terephthalate as a main component with dihydroxyethyl 5-sodiumsulfoisophthalate; or the like). A mixture of two or more of these is also preferable.

The component (A) has an intrinsic viscosity of preferably 0.5 to 1.4, and more preferably 0.5 to 1.0. If the intrinsic viscosity is less than 0.5, the resulting fiber tends to have reduced mechanical strength. If more than 1.4, the melt viscosity is increased as the molecular weight is increased, and thus the fiber tends to be melt spinned only with difficulty, and have a non-uniform size.

There are no specific limitations to the brominated epoxy flame retardant (B) used in the present invention. A conventional brominated epoxy flame retardant may be used.

Specific examples of the component (B) include a terminal non-blocked brominated epoxy flame retardant with, containing a compound represented by the following formula (α):

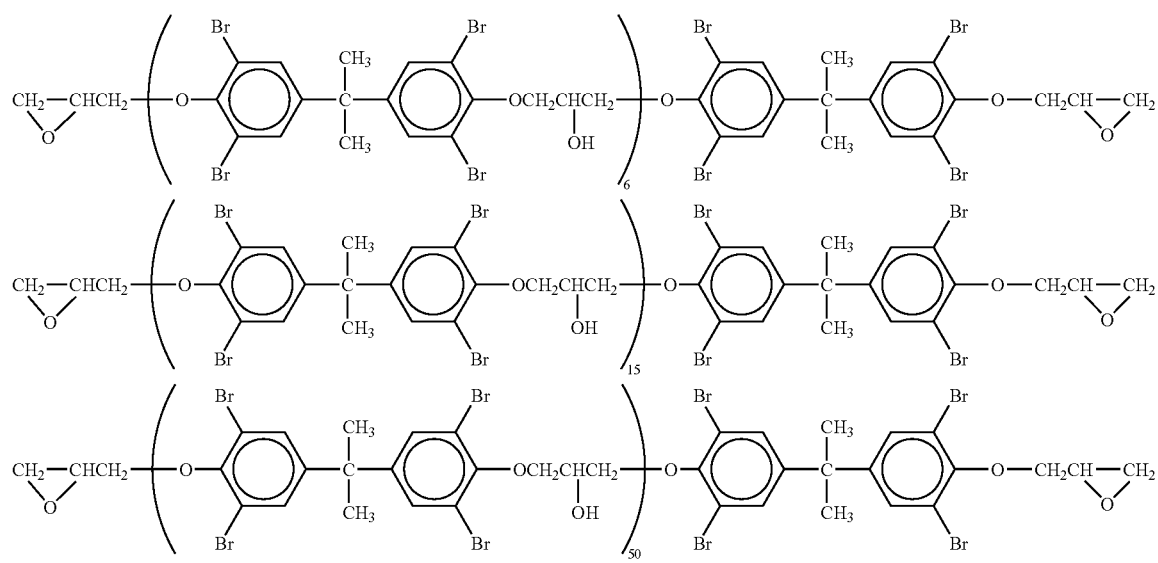
a brominated epoxy flame retardant with one terminal blocked, containing a compound represented by the following formula (β):
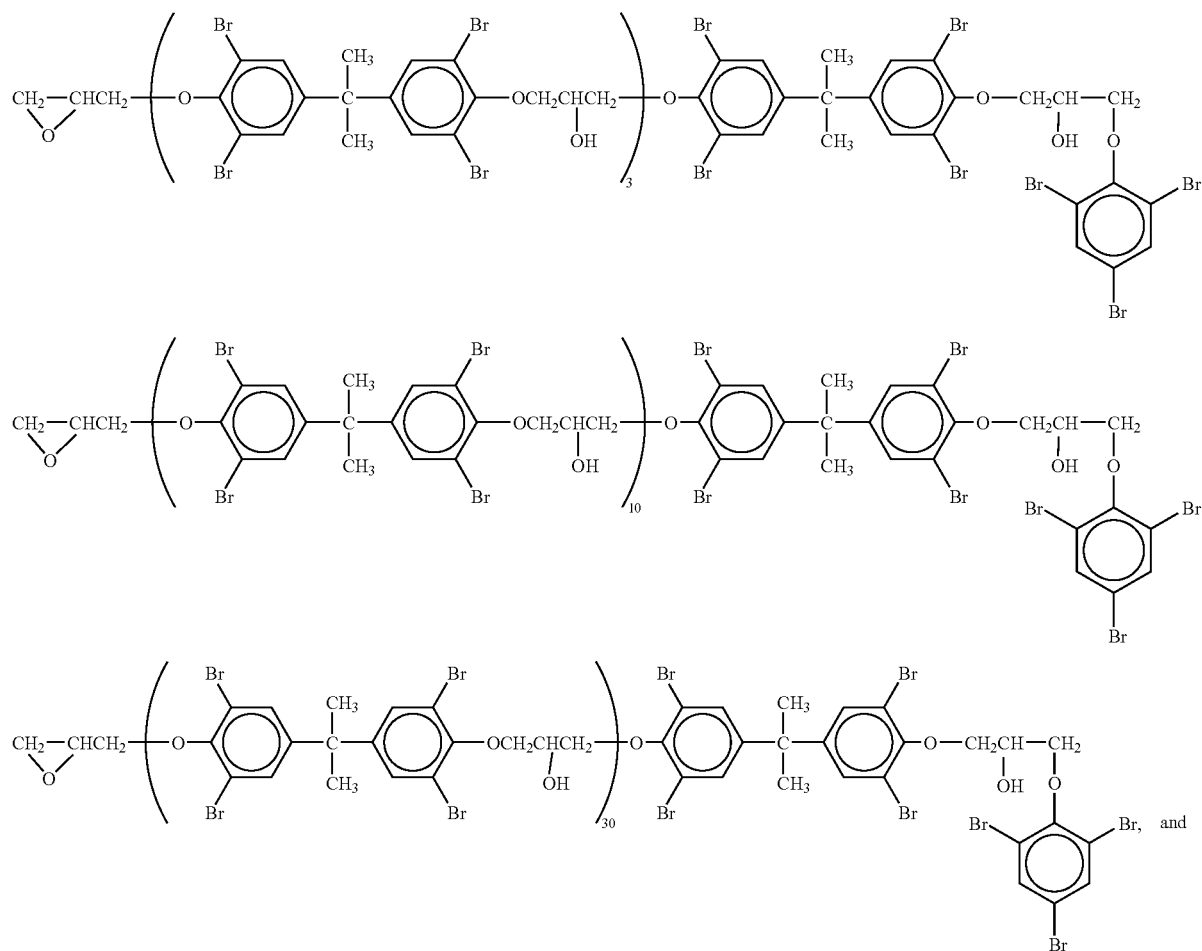

a brominated epoxy flame retardant with both terminals blocked, containing a compound represented by the following formula (γ):

more. If Rz is more than 2.0 µm, fiber gloss is suppressed, but surface roughness increases too much and thus fiber becomes color dulling. Furthermore in the present invention Ra (arith-

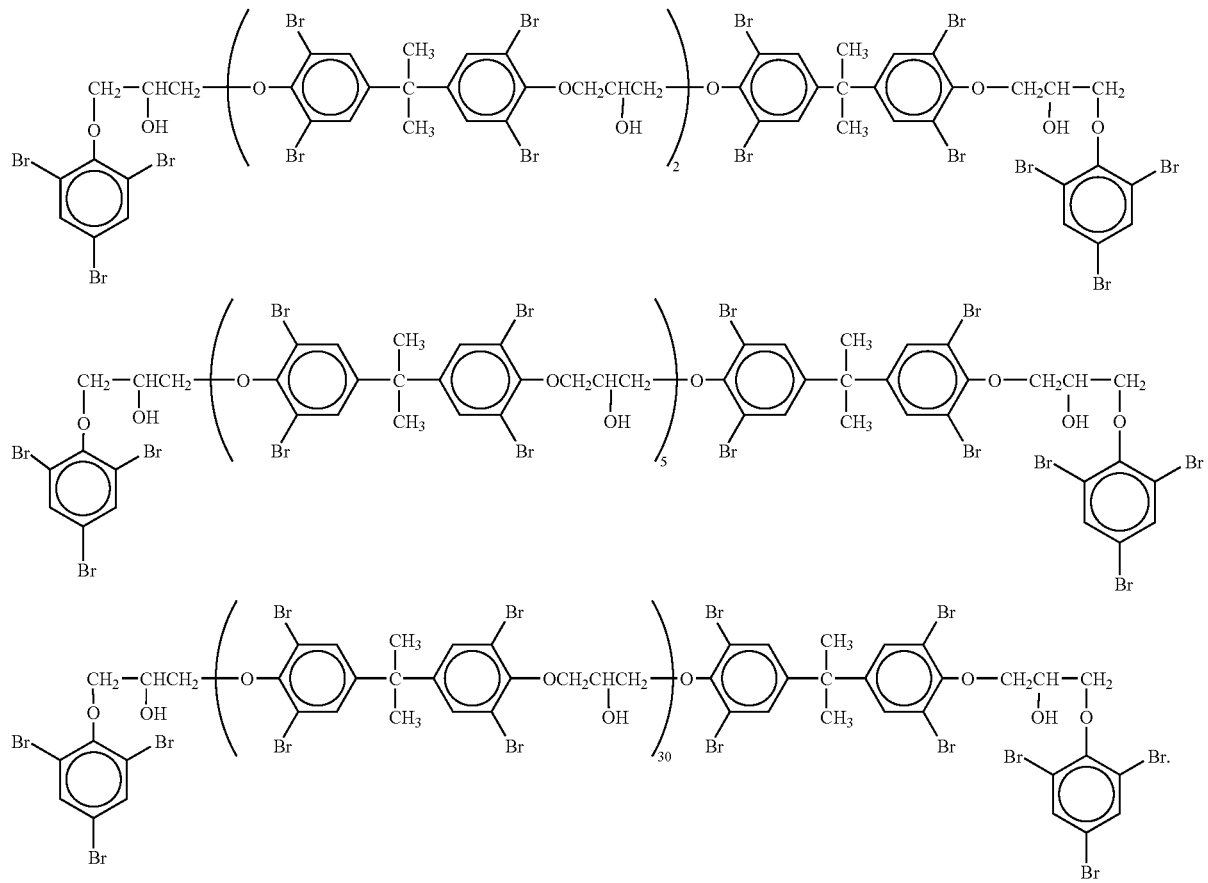

These may be used singly or in a combination of two or more.

The component (B) is used in an amount of 5 to 30 parts by weight based on 100 parts by weight of the component (A). In particularly, the amount is preferably 6 to 25 parts by weight, and more preferably 8 to 20 parts by weight. If the component (B) is used in an amount of less than 5 parts by weight, it is difficult to achieve a flame retardant effect. If more than 30 parts by weight, mechanical properties, heat resistance, and drip resistance are impaired.

The component (B) has a number average molecular weight of preferably 20,000 or more, and more preferably 30,000 to 80,000. If the number average molecular weight is less than 20,000, a domain in which the flame retardant is dispersed in the polyester is small, projections on the fiber surface are small, and the fiber is highly glossy. If the molecular weight is too high, the dispersion domain is large, and the fiber is less colored.

In this invention, presence or absence of minute projections or size thereof on fiber surface are measured by using a laser microscope, calculated based on a calculating formula as defined in JIS B0601-1994 and evaluated by Rz (ten point average roughness) or Ra (arithmetic average roughness). In the present invention Rz (ten point average roughness) is preferably in a range of 0.5 to 2.0 µm, more preferably 0.7 to 2.0 µm, still more preferably 0.7 to 1.1 µm. If Rz is less than 0.5 µm, surface roughness decreases and fiber gloss increases metic average roughness) is preferably in a range of 0.07 to 0.3 µm, more preferably 0.09 to 0.3 µm, still more preferably 0.09 to 0.15 µm. If Ra is less than 0.07 µm, surface roughness decreases and fiber gloss increases more. If Ra is more than 0.3 µm, fiber gloss is suppressed, but surface roughness increases too much and thus fiber becomes color dulling.

As the component (C), any organic resin component may be used insofar as the component is not compatible or partially not compatible with the component (A) as a main component and/or the component (B). For example, a polyallylate, polyamide, fluororesin, silicone resin, crosslinked acrylic resin, crosslinked polystyrene, and the like are preferably used. These may be used singly or in a combination of two or more.

As the component (D), such a component having a refractive index close to those of the component (A) and/or the component (B) is preferable. This is because the component has an influence on transparence and coloration of the fiber. Examples include calcium carbonate, silicon oxide, titanium oxide, aluminum oxide, zinc oxide, talc, kaolin, montmorillonite, bentonite, mica, and an antimony compound. There are no specific limitations to an antimony compound among these used as the component (D). Specific examples include an antimony trioxide compound, an antimony pentoxide compound, and sodium antimonite. Such an antimony compound has a particle size of preferably 0.02 to 5 µm, more preferably 0.02 to 3 μm, and still more preferably 0.02 to 2 μm, but the particle size is not specifically limited thereto. The antimony compound used in the present invention may be surface treated with an epoxy compound, silane compound, isocyanate compound, titanate compound, or the like as required.

The antimony compound is used in an amount of preferably 0.1 to 5 parts by weight, more preferably 0.1 to 3 parts by weight, and still more preferably 0.2 to 2 parts by weight based on 100 parts by weight of the component (A), but the amount is not specifically limited thereto. If the compound is used in an amount of more than 5 parts by weight, the fiber has impaired appearance, hue, and coloration. If less than 0.1 part by weight, only a small number of minute projections are formed on the fiber surface, and thus gloss on the fiber surface is inadequately adjusted. The component (D) may be used in combination with another component (D). In this case, the components (D) are used in a total amount of 5 parts by weight.

The antimony compound is preferably used as the component (D), since the compound can not only control properties of the fiber surface, but also improve the flame retardant effect of the fiber itself.

There are no specific limitations to the hydrophilic fiber treating agent (E) used in the present invention. The fiber treating agent may be a mixture of at least one member selected from the group consisting of polyoxyalkylene alkyl ether, polyoxyalkylene alkenyl ether, polyoxyalkylene aryl ethers, and polyoxyalkylene alkylaryl ether, and their random copolymer polyethers, polyoxyalkylene alkyl ester, polyoxyalkylene alkenyl ester, and polyoxyalkylene alkylaryl ester with a conventionally used ether-containing fiber treating agent such as a polyoxyalkylene alkylamine, N,N-dihydroxyethylalkylamide, polyoxyalkylene alkylamide, glycerol fatty acid ester, polyglycerol fatty acid ester, pentaerythritol fatty acid ester, polyoxyalkylene pentaerythritol alkyl ester, sorbitan fatty acid ester, polyoxyalkylene sorbitan fatty acid ester, sucrose fatty acid ester, polyoxyalkylene sucrose fatty acid ester, polyoxyalkylene, alkylamine salt, alkylammonium salt, alkylaralkylammonium salt, alkylpyridinium salt, alkylpicolinium salt, fatty acid salt, resinate, sulfated fatty acid salt, alkyl sulfonate, alkylbenzene sulfonate, alkylnaphthalene sulfonate, sulfofatty acid alkyl ester salt, dialkyl sulfosuccinate, polyoxyalkylene alkyl ether monosulfosuccinate, polyoxyalkylene alkenyl ether monosulfosuccinate, polyoxyalkylene aryl ether monosulfosuccinate, alkyl diphenyl ether disulfonate, sulfated oil, sulfated fatty acid ester salt, alkyl sulfate, alkenyl sulfate, polyoxyalkylene alkyl ether sulfate, polyoxyalkylene alkyl ether carboxylate, polyoxyalkylene alkenyl ether sulfate, polyoxyalkylene aryl ether sulfate, alkyl phosphate, polyoxyalkylene alkyl ether phosphate, polyoxyalkylene alkenyl ether phosphate, or polyoxyalkylene aryl ether phosphate; or a mixture of a conventionally used ether-containing fiber treating agent with a conventionally used ionic surfactant. However, the fiber treating agent must not contain a compound containing a silicone component, because the treating agent has significantly reduced flame retardance if it contains a constituent having a silicone component as a main component. The hydrophilic fiber treating agent (E) is preferably at least one member selected from the group consisting of a polyether compound, fatty acid ester compound, organic amine, organic amide, organic fatty acid ester, organic amine salt, organic ammonium salt, organic pyridium salt, organic ammonium salt, organic pyridinium salt, organic picolinium salt, organic fatty acid salt, resinate, organic sulfonate, organic succinate, organic monosuccinate, organic carboxylate, and organic sulfate, or a mixture of two or more thereof, and particularly preferably at least one member selected from the group consisting of a polyethylene oxide-polypropylene oxide random copolymer polyether (molecular weight MW: 15,000 to 50,000), polyethylene oxide (molecular weight: 100 to 1,000), and polypropylene oxide (molecular weight: 100 to 1,000). The hydrophilic fiber treating agent (E) is attached to the fiber preferably at a total weight ratio of 0.01% to 1%, in order to provide smooth feeling, combing properties, antistatic properties, and the like. If the hydrophilic fiber treating agent (E) is added in an amount of 0.01% or less, the fiber has insufficient combing properties and smooth feeling. On the other hand, if 1% or more, an oil agent is attached to hands and makes the hands wet when touching a tow filament, and the flame retardance of the fiber may be reduced since the oil agent itself is more or less flammable, unfavorably. In order to make the fiber exhibit excellent smooth feeling and combing properties and sufficient antistatic properties, a 50:50 combination of an ethylene oxide-propylene oxide random copolymer polyether with a cationic surfactant is most preferable. However, the present invention is not limited thereto. The fiber treating agent may be attached to the fiber by treatment continuous from drawing or heat treatment or by batch treatment.

The polyester fiber can have a specific modified cross-section.

Figure 2:
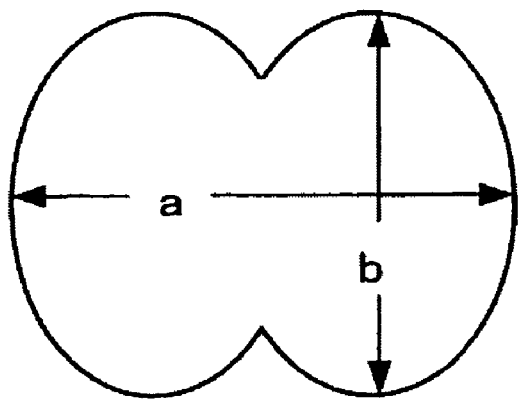
Figure 3:
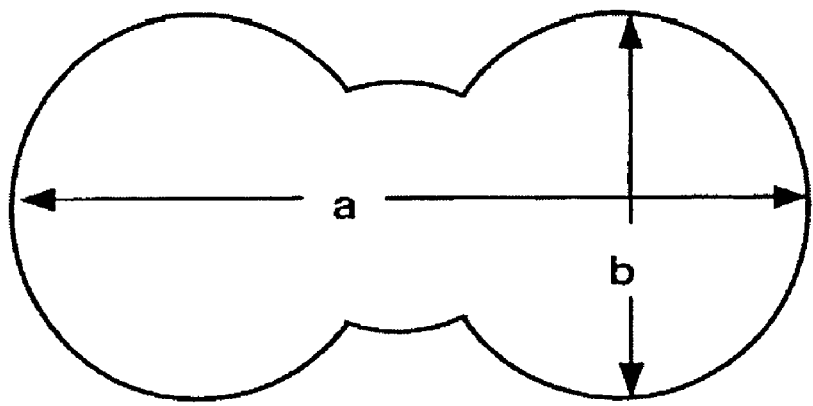

When the fiber of the present invention has a cross-section in which two or more circles or flat circles are lapped or brought into contact with each other (as shown in FIGS. 1 to 3, wherein the ratio of the major axis a to the minor axis b (a/b) is 1.2 to 4), the two or more circles or flat circles lapped or brought into contact with each other are preferably arranged on a straight line and bilaterally symmetric.

Figure 4:
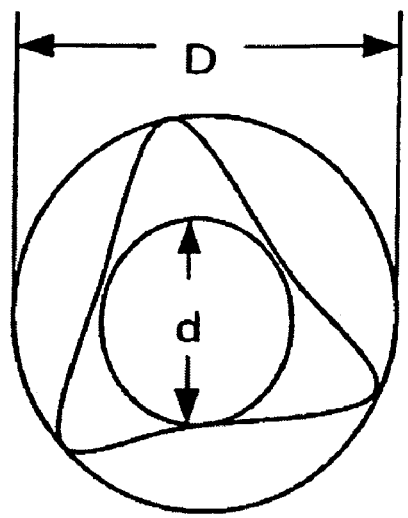
Figure 5:
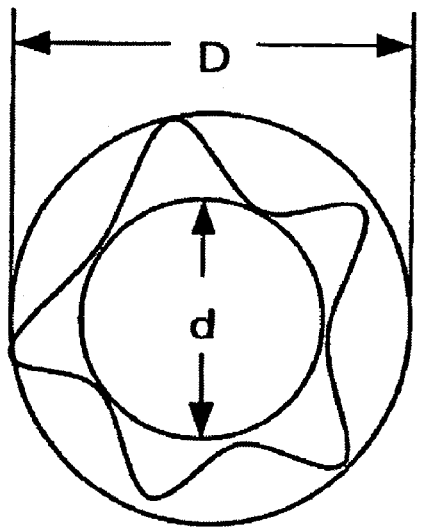
Figure 6:
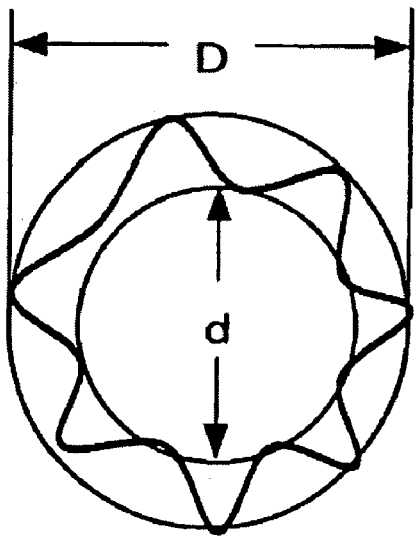

When the fiber of the present invention has a cross-section with a shape of three to eight leaves (of which examples are shown in FIGS. 4 to 6, wherein the ratio of the circumscribed circle diameter D to the inscribed circle diameter d (D/d) is 1.1 to 8), the fiber has a degree of modification represented by the expression (1) of preferably 1.1 to 8, and more preferably 1.3 to 6. If the degree of modification exceeds 8, the fiber tends to exhibits impaired feeling and combing properties. If less than 1.1, the fiber tends to be felt hard. If the cross-section has a shape of nine or more leaves, its difference from a round cross-section tends to be small, and the effect of the present invention tends to be decreased.

Degree of modification=(Circumscribed circle diameter of monofilament cross-section)/(Inscribed circle diameter of monofilament cross-section)　　(Expression 1)

In the present invention, the modified cross-section has a flatness ratio (ratio of the major axis length to the minor axis length in the cross-section) of preferably 1.2 to 4, and more preferably 1.5 to 2.5, as shown in FIG. 7, wherein the ratio of the major axis x to the minor axis y (x/y) is 1.2 to 4. If the flatness ratio exceeds 4, the fiber cannot be provided with luster and feeling close to human hair. If less than 1.2, the fiber tends to have a hard texture.

When the polyester fiber of the present invention used is a mixture of a fiber having a round cross-section with a fiber having at least one modified cross-section selected from the group consisting of shapes of an ellipse, crossed circles, a cocoon, a potbelly, a dog bone, a ribbon, three to eight leaves, and a star, the mixing ratio of the fiber having a round cross-section to the fiber having a modified cross-section is preferably 8:2 to 1:9, and more preferably 7:3 to 2:8.

The modified cross-section fiber of the present invention as described above preferably has a size of 30 to 80 dtex when used for artificial hair. Further, when the modified cross-section fiber is blended with human hair at any ratio, the resulting hair goods can have any hairstyle freely. If the modified cross-section fiber of the present invention is blended in too high a proportion, the resulting product is felt hard. If the modified cross-section fiber is blended in too low a proportion, the hair goods cannot have any hairstyle freely. For this reason, it is preferable that 80 to 10 wt % of the modified cross-section fiber be blended with 20 to 80 wt % of human hair.

The modified cross-section fiber can be blended for use with another fiber for artificial hair conventionally used, for example, an acrylonitrile fiber, vinyl chloride fiber, vinylidene chloride fiber, polyester fiber, nylon fiber, or polyolefin fiber, in addition to the aforementioned human hair.

The flame retardant polyester composition used in the present invention can be produced by, for example, dry blending the components (A) and (B) and the optional component (C) or (D) in advance, and then melt kneading the components in various common kneading machines. Examples of the kneading machines include a single-screw extruder, twin-screw extruder, roll, Banbury mixer, and kneader. Of these, a twin-screw extruder is preferable in terms of adjustment of the kneading degree and convenience for operation.

The flame retardant polyester fiber for artificial hair of the present invention can be produced by melt spinning the flame retardant polyester composition by a typical melt spinning process.

Specifically, a spun yarn can be obtained by, for example, melt spinning the composition while setting an extruder, gear pump, spinneret, and the like at a temperature of 270 to 310° C.; allowing the spun yarn to pass through a heating tube; then cooling the yarn to a glass transition temperature or lower; and taking off the yarn at a rate of 50 to 5,000 m/min. The size of the spun yarn can also be controlled by cooling the yarn in a tank filled with cooling water. The temperature or length of the heat sleeve, the temperature or spraying amount of cooling air, the temperature of the cooling tank, the cooling time, and the take-off rate can be appropriately adjusted according to the discharge amount and the number of holes in the spinneret.

The resulting spun yarn may be hot drawn by either a two-step process comprising winding up the spun yarn once and then drawing the yarn, or a direct spinning and drawing process comprising successively drawing the spun yarn without winding. Hot drawing is carried out by a one-stage drawing process or a multistage drawing process. As heating means in hot drawing, a heat roller, heat plate, steam jet apparatus, hot water tank, or the like can be used. These can be appropriately used in combination.

The flame retardant polyester fiber for artificial hair of the present invention may contain various additives such as a flame retardant other than the component (B), a heat resistant agent, a photostabilizer, a fluorescent agent, an antioxidant, an antistatic agent, a pigment, a plasticizer, and a lubricant as required. The fiber containing a pigment can be provided as a spun dyed fiber.

When the flame retardant polyester fiber for artificial hair of the present invention thus obtained is a fiber in the form of a non-crimped raw silk, and has a size of usually 30 to 80 dtex, and furthermore 35 to 75 dtex, the fiber is suitable for artificial hair. Preferably, the fiber for artificial hair has heat resistance to allow a thermal appliance for beauty (hair iron) to be used therefor at 160 to 200° C., catches fire only with difficulty, and has self-extinguishing properties.

When the flame retardant polyester fiber of the present invention is spun dyed, the fiber can be used as is. When the fiber is not spun dyed, it can be dyed under the same conditions as in a common flame retardant polyester fiber.

The pigment, dye, adjuvant, or the like used for dyeing preferably exhibits excellent weather resistance and flame retardance.

The flame retardant polyester fiber for artificial hair of the present invention exhibits excellent curl setting properties and curl holding properties when a thermal appliance for beauty (hair iron) is used. When the component (C) or (D) is added to the fiber if necessary, the fiber can have a surface with irregularities, can be appropriately matted, and can be more suitably used for artificial hair. Further, the hydrophilic fiber treating agent (E) or an oil agent such as a softening agent can provide the fiber with feeling and texture and make the fiber closer to human hair.

The flame retardant polyester fiber for artificial hair of the present invention may be used in combination with another material for artificial hair such as a modacrylic fiber, polyvinyl chloride fiber, or nylon fiber, or in combination with human hair.

Generally, human hair used in hair products such as wigs, hair wigs, or extensions has cuticle treated, is bleached or dyed, and contains a silicone fiber treating agent or softening agent in order to ensure its feeling and combing properties. Thus, the human hair is flammable, unlike untreated human hair. However, when the human hair is blended with the flame retardant polyester fiber for artificial hair of the present invention at a human hair blending ratio of 60% or less, the product exhibits excellent flame retardance.

EXAMPLES

Next, the present invention will be described in more detail with reference to Examples. However, the present invention should not be limited thereto.

Properties values are measured as follows.

(Combing Properties)

A fiber surface treating agent is attached to a tow filament with a length of 30 cm and a total size of 100,000 dtex. The treated tow filament is combed with a comb (made of Derlin resin) to evaluate ease of combing.

Good: Filament is combed with almost no resistance (light)

Fair: Filament is combed with a little resistance (heavy)

Bad: Filament is combed with a large resistance, or becomes uncombable in the middle (Strength and Elongation)

Tensile strength and elongation of a filament are measured using INTESCO Model 201 manufactured by INTESCO Co., Ltd. Both 10 mm-long ends of one 40 mm-long filament are sandwiched in a board (thin paper) to which a two-sided tape pasted with an adhesive is bonded, and are air-dried overnight to prepare a sample with a length of 20 mm. The sample is mounted on a test machine, and a test is carried out at a temperature of 24° C., at a humidity of 80% or less, at a load of 0.034 cN×size (dtex), and at a tensile rate of 20 mm/min to measure strength and elongation. The test is repeated ten times under the same conditions, and the average values are defined as strength and elongation of the filament.

(Flame Retardance)

A filament is cut into filaments with a length of 150 mm each. Filaments with a weight of 0.7 g are bundled, with one end of the bundle sandwiched by a clamp, and the bundle is fixed on a stand and hung vertically. The fixed filaments with an effective length of 120 mm are brought into contact with 20 mm-long fire for 3 seconds, and burned.

Flammability

Very good: Afterflame time is 0 second (Filaments do not catch fire)
Good: Afterflame time is less than 3 seconds
Fair: Afterflame time is 3 to 10 seconds
Bad: Afterflame time is more than 10 seconds Drip Resistance Very good: The number of drips until extinguishment is 0
Good: The number of drips until extinguishment is 5 or less
Fair: The number of drips until extinguishment is 6 to 10
Bad: The number of drips until extinguishment is 11 or more (Gloss)

A tow filament with a length of 30 cm and a total size of 100,000 dtex is visually evaluated under sunlight.

Very good: Gloss is adjusted to be the same as in human hair
Good: Gloss is appropriately adjusted
Fair: Gloss is a little too high or a little too low
Bad: Gloss is too high or too low (Transparence)

A tow filament with a length of 30 cm and a total size of 100,000 dtex is visually evaluated under sunlight.

Good: Transparent and deep-colored (bright)
Fair: A little opaque (cloudy)
Bad: Opaque and not deep-colored (Devitrification Resistance)

A tow filament with a length of 10 cm and a total size of 100,000 dtex is processed with steam (at 120° C. and at a relative humidity of 100% for 1 hour), and then sufficiently dried at room temperature. The change in gloss and hue between the tow filament before steam processing and the tow filament after steam processing is examined. As the change is more significant, the tow filament exhibits lower devitrification resistance.

Very good: Neither gloss nor hue is changed
Good: Gloss is not changed, but hue is slightly changed
Fair: Both gloss and hue are slightly changed
Bad: Both gloss and hue are obviously changed (Feeling)

Stickiness

A tow filament with a length of 30 cm and a total size of 100,000 dtex is allowed to stand in a room with constant temperature and humidity (at 23° C. and at a relative humidity of 55%) for 3 hours, and then evaluated using a thumb, forefinger, and middle finger on the right hand.

Good: Not sticky
Fair: A little sticky
Bad: Sticky

Smooth Feeling

A tow filament with a length of 30 cm and a total size of 100,000 dtex is allowed to stand in a thermo-hygrostatic chamber (at 23° C. and at a relative humidity of 55%) for 3 hours, and then evaluated using a thumb, forefinger, and middle finger on the right hand.

Very good: Smooth and very slippy
Good: Smooth and slippy
Fair: Not so slippy
Bad: Not slippy (Surface Roughness)

Surface roughness was measured using a laser microscope (VK-9500, manufactured by Keyence Corp.). The sides of 10 fibers in parallel with the fiber axes were measured at a magnification of 3,000 (objective lens magnification: 150× built-in lens magnification: 20) to obtain an image. Surface roughness was calculated from this image based on a calculation formula in accordance with the definition of surface roughness (JIS B0601-1994).

(Iron Setting Properties)

Iron setting properties are an index of the extent to which a hair iron can perform curl setting easily and hold the curl shape. Filaments are loosely sandwiched in a hair iron heated to 180° C., and pre-heated three times by rubbing. Adhesion and combing among the filaments, and frizz and breakage of the filaments are visually evaluated. Next, the pre-heated filaments are wound around the hair iron and held for 10 seconds, and then the iron is withdrawn. The degree of ease of withdrawing the iron (rod out properties) and curl holding properties when withdrawing the iron are visually evaluated.

(Curl Setting Properties)

Straw-haired filaments are wound around a pipe with a diameter of 32 mm. Curl setting is performed at 110° C. for 60 minutes, and aging is performed at room temperature for 60 minutes. Then, one ends of the curled filaments are fixed, and the filaments are hung down to visually evaluate the degree of ease of curl setting and stability of the curl.

Good: The curl is sufficiently set and is stable
Fair, The curl is set, but is not stable
Bad: The curl is not sufficiently set Examples 1 to 15

To a composition made of polyethylene terephthalate dried to have a moisture content of 100 ppm or less, a brominated epoxy flame retardant, organic fine particles, and inorganic fine particles at a composition ratio shown in Tables 1 and 2, 2 parts of a coloring polyester pellet PESM6100 BLACK (manufactured by Dainichiseika Color & Chemicals Mfg. Co., Ltd., carbon black content: 30%, polyester contained in the component (A)) was added, and the components were dry blended. The blend was fed into a twin-screw extruder and melt kneaded at 280° C. to form a pellet. Then, the pellet was dried to have a moisture content of 100 ppm or less. Next, the pellet was put into a melt spinning machine, and the molten polymer was spun through a spinneret having round cross-sectional nozzle holes with a nozzle diameter of 0.5 mm each at 280° C., air-cooled, and rolled up at a rate of 100 m/min to obtain a spun yarn. The resulting spun yarn was drawn in a hot water bath at 80° C. to prepare a yarn at a draw ratio of 4. The drawn yarn was wound up around a heat roll heated to 200° C. at a rate of 30 m/min and heat-treated. Fiber treating agents KWC-Q (ethylene oxide-propylene oxide random copolymer polyether, manufactured by Marubishi Oil Chemical Co., Ltd.) and KRE-103 (cationic surfactant, manufactured by Matsumoto Yushi-Seiyaku Co., Ltd.) were attached to the yarn in an amount of 0.20% omf, respectively, to obtain a polyester fiber (multifilament) having a monofilament size of about 50 dtex.

TABLE 1

| | number average molecular weight | Example 1 | 2 | 3 | 4 | 5 | 6 | 7 | 8 | 9 |
|---|---|---|---|---|---|---|---|---|---|---|
| EFG-85A*[1] | — | 100 | 100 | 100 | 100 | 100 | 100 | 100 | 100 | 100 |
| EP-200*[2] | 17,000 | 10 | | | | | | | | |
| EC-200*[2] | 16,000 | | 10 | | | | | | | |
| EPC-15*[2] | 1,500 | | | 10 | 15 | | | | | |
| YDB-412*[3] | 4,000 | | | | | 10 | 15 | | | |
| SR-T2000*[4] | 4,000 | | | | | | | 15 | | |
| SR-T5000*[4] | 10,000 | | | | | | | | 10 | |
| SR-T7040*[4] | 14,000 | | | | | | | | | 10 |
| U Polymer U-100*[5] | — | | | 2 | | | | | | |
| Tipaque CR-60*[6] | — | 0.2 | 0.2 | | 0.2 | | | | | |
| PKP-53*[7] | — | | | | | 0.6 | 0.6 | 0.6 | 0.6 | 0.6 |

*[1]Polyethylene terephthalate, manufactured by Kanebo Gohsen, Ltd.
*[2]Terminal blocked/terminal non-blocked brominated epoxy flame retardant, manufactured by Dainippon Ink and Chemicals, Inc.
*[3]Terminal non-blocked brominated epoxy flame retardant, manufactured by Tohto Kasei Co., Ltd.
*[4]Terminal blocked/terminal non-blocked brominated epoxy flame retardant, manufactured by Sakamoto Yakuhin Kogyo Co., Ltd.
*[5]Polyallylate, manufactured by Unitika Ltd.
*[6]Titanium oxide, manufactured by Ishihara Sangyo Kaisha, Ltd.
*[7]Talc, manufactured by Fuji talc Industrial Co., Ltd.

TABLE 2

| | Example 10 | 11 | 12 | 13 | 14 | 15 |
|---|---|---|---|---|---|---|
| EFG-85A*[1] | 100 | 100 | 100 | 100 | 100 | 100 |
| XAC-4965*[9] | 15 | | | | | |
| SR-T20000*[10] | | | 12 | 16 | | |
| YPB-43M*[11] | | | | 5 | 10 | 15 |
| U Polymer U-100*[5] | | 2 | | | | |
| PKP-53*[7] | 0.6 | | 0.6 | | | |

*[1]Polyethylene terephthalate, manufactured by Kanebo Gohsen, Ltd.
*[9]Terminal non-blocked brominated epoxy flame retardant, manufactured by Asahi Kasei Corp.
*[10]Terminal non-blocked brominated epoxy flame retardant, number average molecular weight: 30,000, manufactured by Sakamoto Yakuhin Kogyo Co., Ltd.
*[11]Terminal non-blocked brominated epoxy flame retardant, number average molecular weight: 40,000, manufactured by Tohto Kasei Co., Ltd.
*[5]Polyallylate, manufactured by Unitika Ltd.
*[7]Talc, manufactured by Fuji talc Industrial Co., Ltd.

Strength and elongation, flame retardance, gloss, transparence, devitrification resistance, combing properties, feeling, surface roughness, iron setting properties, and curl setting properties of the resulting fiber were evaluated. The results are shown in Tables 3 and 4.

TABLE 3

| | | Example 1 | 2 | 3 | 4 | 5 | 6 | 7 | 8 | 9 |
|---|---|---|---|---|---|---|---|---|---|---|
| Nozzle shape | | Round | Round | Round | Round | Round | Round | Round | Round | Round |
| Size (dtex) | | 52 | 53 | 48 | 51 | 50 | 48 | 52 | 49 | 52 |
| Amount of fiber treating agents attached (% omf) | KWC-Q | 0.2 | 0.2 | 0.2 | 0.2 | 0.2 | 0.2 | 0.2 | 0.2 | 0.2 |
| | KRE-103 | 0.2 | 0.2 | 0.2 | 0.2 | 0.2 | 0.2 | 0.2 | 0.2 | 0.2 |
| Strength (cN/dtex) | | 2.7 | 2.5 | 2.1 | 2.3 | 2.7 | 3.0 | 2.3 | 2.4 | 2.2 |
| Elongation (%) | | 43 | 46 | 44 | 40 | 46 | 40 | 55 | 49 | 58 |
| Flame retardance | Flammability | Good | Good | Good | Very good | Good | Very good | Good | Good | Good |
| | Drip resistance | Very good | Very good | Good | Very good | Very good | Very good | Good | Very good | Very good |
| Gloss | | Good | Good | Very good | Good | Good | Good | Good | Good | Good |
| Transparence | | Good | Good | Good | Good | Good | Good | Good | Good | Good |
| Devitrification resistance | | Good | Good | Good | Good | Good | Good | Very good | Very good | Good |
| Combing properties | | Good | Good | Good | Good | Good | Good | Good | Good | Good |
| Feeling | Stickiness reduction | Good | Good | Good | Good | Good | Good | Good | Good | Good |
| | Smooth feeling | Good | Good | Good | Good | Good | Good | Good | Good | Good |

TABLE 3-continued

|  |  | Example |  |  |  |  |  |  |  |  |
|---|---|---|---|---|---|---|---|---|---|---|
|  |  | 1 | 2 | 3 | 4 | 5 | 6 | 7 | 8 | 9 |
| Surface roughness | Arithmetic mean roughness (μm) | 0.09 | 0.09 | 0.14 | 0.07 | 0.09 | 0.09 | 0.10 | 0.11 | 0.12 |
|  | Ten-point mean roughness (μm) | 0.6 | 0.7 | 1.1 | 0.5 | 0.6 | 0.7 | 0.8 | 0.8 | 0.8 |
| Iron setting properties (180° C.) | Adhesion | Good | Good | Good | Good | Good | Good | Good | Good | Good |
|  | Crimping/end breakage | Good | Good | Good | Good | Good | Good | Good | Good | Good |
|  | Rod out | Good | Good | Good | Good | Good | Good | Good | Good | Good |
|  | Holding properties | Good | Good | Good | Good | Good | Good | Good | Good | Good |
| Curl setting properties (110° C.) |  | Good | Good | Good | Good | Good | Good | Good | Good | Good |

TABLE 4

|  |  | Example |  |  |  |  |  |
|---|---|---|---|---|---|---|---|
|  |  | 10 | 11 | 12 | 13 | 14 | 15 |
| Nozzle shape |  | Round | Round | Round | Round | Round | Round |
| Size (dtex) |  | 48 | 51 | 53 | 50 | 52 | 51 |
| Amount of fiber treating agents attached (% omf) | KWC-Q | 0.2 | 0.2 | 0.2 | 0.2 | 0.2 | 0.2 |
|  | KRE-103 | 0.2 | 0.2 | 0.2 | 0.2 | 0.2 | 0.2 |
| Strength (cN/dtex) |  | 2.6 | 2.8 | 2.8 | 2.9 | 2.8 | 2.5 |
| Elongation (%) |  | 48 | 43 | 39 | 51 | 46 | 44 |
| Flame retardance | Flammability | Very good | Very good | Very good | Good | Good | Very good |
|  | Drip resistance | Very good | Very good | Very good | Good | Very good | Very good |
| Gloss |  | Good | Very good | Good | Good | Very good | Very good |
| Transparence |  | Good | Good | Good | Very good | Good | Good |
| Devitrification resistance |  | Very good | Very good | Very good | Good | Good | Good |
| Combing properties |  | Good | Good | Good | Good | Good | Good |
| Feeling | Stickiness reduction | Good | Good | Good | Good | Good | Good |
|  | Smooth feeling | Good | Good | Good | Good | Good | Good |
| Surface roughness | Arithmetic mean roughness (μm) | 0.09 | 0.15 | 0.11 | 0.10 | 0.14 | 0.13 |
|  | Ten-point mean roughness (μm) | 0.6 | 1.1 | 0.8 | 0.7 | 1.0 | 0.8 |
| Iron setting properties (180° C.) | Adhesion | Good | Good | Good | Good | Good | Good |
|  | Crimping/end breakage | Good | Good | Good | Good | Good | Good |
|  | Rod out | Good | Good | Good | Good | Good | Good |
|  | Holding properties | Good | Good | Good | Good | Good | Good |
| Curl setting properties (110° C.) |  | Good | Good | Good | Good | Good | Good |

Comparative Examples 1 to 5

To a composition made of polyethylene terephthalate dried to have a moisture content of 100 ppm or less, a brominated epoxy flame retardant, and inorganic fine particles at a composition ratio shown in Table 5, 2 parts of a coloring polyester pellet PESM6100 BLACK (manufactured by Dainichiseika Color & Chemicals Mfg. Co., Ltd., carbon black content: 30%, polyester contained in the component (A)) was added, and the components were dry blended. The blend was fed into a twin-screw extruder and melt kneaded at 280° C. to form a pellet. Then, the pellet was dried to have a moisture content of 100 ppm or less. Next, the pellet was put into a melt spinning machine, and the molten polymer was discharged from a spinneret having round cross-sectional nozzle holes with a nozzle diameter of 0.5 mm each at 280° C., air-cooled, and wound up at a rate of 100 m/min to obtain a spun yarn. The resulting spun yarn was drawn in a hot water bath at 80° C. to prepare a yarn at a draw ratio of 4. The drawn yarn was wound up around a heat roll heated to 200° C. at a rate of 30 m/min and heat-treated. Fiber treating agents KWC-Q (ethylene oxide-propylene oxide random copolymer polyether, manufactured by Marubishi Oil Chemical Co., Ltd.) and KRE-103 (cationic surfactant, manufactured by Matsumoto Yushi-Seiyaku Co., Ltd.) were attached to the yarn in an amount of 0.20% omf, respectively, to obtain a polyester fiber (multifilament) having a monofilament size of about 50 dtex.

Strength and elongation, flame retardance, gloss, transparence, devitrification resistance, combing properties, feeling, surface roughness, iron setting properties, and curl setting properties of the resulting fiber were evaluated. The results are shown in Table 6.

TABLE 5

|  | Comparative Example | | | | |
|---|---|---|---|---|---|
|  | 1 | 2 | 3 | 4 | 5 |
| EFG-85A*[1] | 100 | 100 |  | 100 | 100 |
| Triphenyl phosphate | 10 |  |  |  |  |
| PX-200*[12] |  | 10 |  |  |  |
| Heim RH-416*[13] |  |  | 100 |  |  |
| Pyrochek 68PB*[14] |  |  |  | 6 |  |
| FR-1808*[15] |  |  |  |  | 10 |
| Tipaque CR-60*[6] |  |  | 1 |  |  |

*[1]Polyethylene terephthalate, manufactured by Kanebo Gohsen, Ltd.
*[12]Condensed phosphate flame retardant, manufactured by Daihachi Chemical Industry Co., Ltd.
*[13]Phosphorus flame retardant copolymer polyester, manufactured by Toyobo Co., Ltd.
*[14]Brominated polystyrene flame retardant, manufactured by Nissan Ferro Organic Chemical Co., Ltd.
*[15]Octabromotrimethylphenylindane, manufactured by Bromokem Far East Ltd.
*[6]Titanium oxide, manufactured by Ishihara Sangyo Kaisha, Ltd.

TABLE 6

|  |  | Comparative Example | | | | |
|---|---|---|---|---|---|---|
|  |  | 1 | 2 | 3 | 4 | 5 |
| Nozzle shape |  | Round | Round | Round | Round | Round |
| Size (dtex) |  | 52 | 48 | 47 | 47 | 50 |
| Amount of | KWC-Q | 0.2 | 0.2 | 0.2 | 0.2 | 0.2 |
| fiber | KRE-103 | 0.2 | 0.2 | 0.2 | 0.2 | 0.2 |
| treating agents attached (% omf) |  |  |  |  |  |  |
| Strength (cN/dtex) |  | 2.2 | 2.0 | 1.9 | 2.9 | 2.6 |
| Elongation (%) |  | 68 | 63 | 42 | 52 | 47 |
| Flame retardance | Flammability | Fair | Fair | Good | Very good | Very good |
|  | Drip resistance | Bad | Bad | Bad | Very good | Very good |
| Gloss |  | Bad | Fair | Fair | Very good | Bad |
| Transparence |  | Fair | fair | Fair | Bad | Fair |
| Devitrification resistance |  | Fair | Fair | Bad | Fair | Fair |
| Combing properties |  | Bad | Bad | Fair | Fair | Bad |
| Feeling | Stickiness reduction | Bad | Bad | Bad | Good | Bad |
|  | Smooth feeling | Bad | Bad | Bad | Good | Bad |

TABLE 6-continued

|  |  | Comparative Example | | | | |
|---|---|---|---|---|---|---|
|  |  | 1 | 2 | 3 | 4 | 5 |
| Surface roughness | Arithmetic mean roughness (μm) | 0.01 | 0.06 | 0.05 | 0.12 | 0.01 |
|  | Ten-point mean roughness (μm) | 0.1 | 0.4 | 0.4 | 0.5 | 0.4 |
| Iron setting properties (180° C.) | Adhesion | Bad | Bad | Bad | Good | Good |
|  | Crimping/end breakage | Fair | Fair | Fair | Good | Good |
|  | Rod out | Bad | Bad | Bad | Good | Good |
|  | Holding properties | Good | Good | Good | Good | Good |
| Curl setting properties (110° C.) |  | Fair | Fair | Fair | Fair | Fair |

As shown in Tables 3 and 4, it was confirmed that the fibers of Examples are superior to the fibers of Comparative Examples in terms of flame retardance, gloss, transparence, devitrification resistance, combing properties, feeling, iron setting properties, and curl setting properties. Accordingly, it was confirmed that the fiber for artificial hair of interest using a brominated epoxy flame retardant can be effectively used as artificial hair with improved flame retardance, gloss, transparence, setting properties, devitrification resistance, and combing properties, while maintaining mechanical properties and thermal properties possessed by polyester.

Examples 16 to 22

To a composition made of polyethylene terephthalate dried to have a moisture content of 100 ppm or less, a brominated epoxy flame retardant, and inorganic fine particles at a composition ratio shown in Table 7, 2 parts of a coloring polyester pellet PESM6100 BLACK (manufactured by Dainichiseika Color & Chemicals Mfg. Co., Ltd., carbon black content: 30%, polyester contained in the component (A)) was added, and the components were dry blended. The blend was fed into a twin-screw extruder and melt kneaded at 280° C. to form a pellet. Then, the pellet was dried to have a moisture content of 100 ppm or less. Next, the pellet was put into a melt spinning machine, and the molten polymer was discharged from a spinneret having nozzle holes with a cross-section of FIGS. 8 to 10 at 280° C., air-cooled, and wound up at a rate of 100 m/min to obtain a spun yarn. The resulting spun yarn was drawn in a hot water bath at 80° C. to prepare a yarn at a draw ratio of 4. The drawn yarn was wound up around a heat roll heated to 200° C. at a rate of 30 m/min and heat-treated. Fiber treating agents KWC-Q (ethylene oxide-propylene oxide random copolymer polyether, manufactured by Marubishi Oil Chemical Co., Ltd.) and KRE-103 (cationic surfactant, manufactured by Matsumoto Yushi-Seiyaku Co., Ltd.) were attached to the yarn in an amount of 0.20% omf, respectively, to obtain a polyester fiber (multifilament) having a monofilament size of about 60 to 70 dtex.

(In FIG. 8, A is 0.9 mm, and B is 0.4 mm.)

(In FIG. 9, A is 1.0 mm, B is 0.35 mm, and C is 0.25 mm.)

Figure 10:
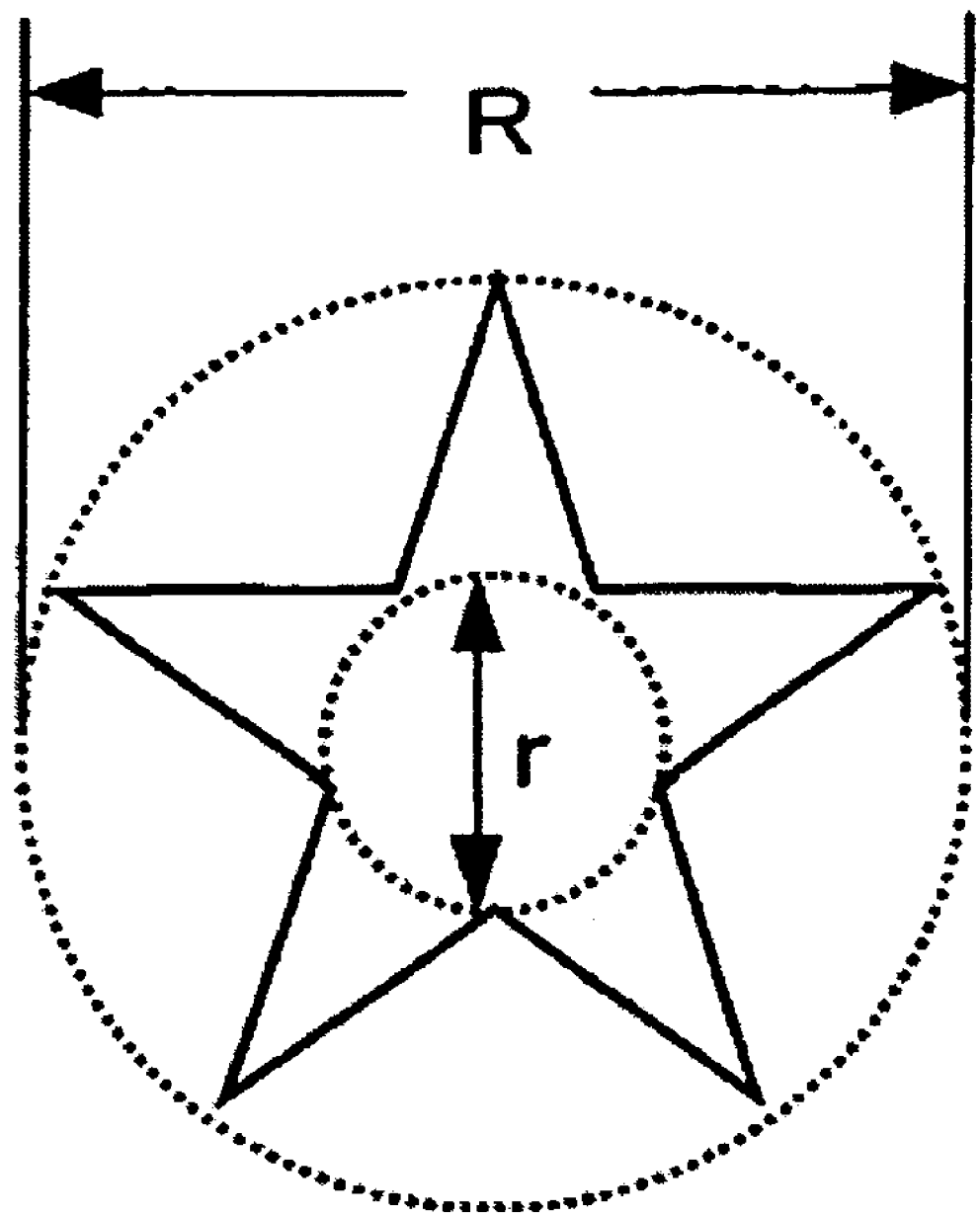

(In FIG. 10, R is 0.6 mm, and r is 0.4 mm.)

Strength and elongation, flame retardance, gloss, transparence, devitrification resistance, combing properties, feeling, surface roughness, iron setting properties, and curl setting properties of the resulting fiber were evaluated. The results are shown in Table 8.

TABLE 7

| | Example | | | | | | |
|---|---|---|---|---|---|---|---|
| | 16 | 17 | 18 | 19 | 20 | 21 | 22 |
| EFG-85A*1 | 100 | 100 | 100 | 100 | 100 | 100 | 100 |
| SR-T20000*10 | 10 | 10 | 10 | 10 | 10 | | |
| YPB-43M*11 | | | | | | 15 | 15 |

TABLE 7-continued

| | Example | | | | | | |
|---|---|---|---|---|---|---|---|
| | 16 | 17 | 18 | 19 | 20 | 21 | 22 |
| PKP-53*7 | 0.5 | 0.5 | 0.5 | 0.5 | 0.5 | | |
| Imsil A-8*16 | 0.5 | 0.5 | 0.5 | 0.5 | 0.5 | | |

*1 Polyethylene terephthalate, manufactured by Kanebo Gohsen, Ltd.
*10 Terminal non-blocked brominated epoxy flame retardant, number average molecular weight: 30,000, manufactured by Sakamoto Yakuhin Kogyo Co., Ltd.
*11 Terminal non-blocked brominated epoxy flame retardant, number average molecular weight: 40,000, manufactured by Tohto Kasei Co., Ltd.
*7 Talc, manufactured by Fuji talc Industrial Co., Ltd.
*16 Silica, manufactured by Unimin Corp.

TABLE 8

| | | Example | | | | | | |
|---|---|---|---|---|---|---|---|---|
| | | 16 | 17 | 18 | 19 | 20 | 21 | 22 |
| Nozzle shape | | Modified 1 | Modified 2 | Modified 3 | Modified 1/Round = 67/33 | Modified 1/Round = 50/50 | Modified 1 | Modified 2 |
| Size (dtex) | | 67 | 65 | 68 | 62 | 59 | 70 | 68 |
| Amount of fiber treating agents attached (% omf) | KWC-Q | 0.2 | 0.2 | 0.2 | 0.2 | 0.2 | 0.2 | 0.2 |
| | KRE-103 | 0.2 | 0.2 | 0.2 | 0.2 | 0.2 | 0.2 | 0.2 |
| Strength (cN/dtex) | | 2.5 | 2.2 | 1.8 | 2.7 | 2.9 | 2.4 | 2.2 |
| Elongation (%) | | 68 | 53 | 38 | 59 | 52 | 53 | 48 |
| Flame retardance | Flammability | Very good | Very good | Very good | Very good | Very good | Very good | Very good |
| | Drip resistance | Very good | Very good | Very good | Very good | Very good | Very good | Very good |
| Gloss | | Good | Good | Good | Good | Good | Very good | Very good |
| Transparence | | Good | Good | Good | Good | Good | Good | Good |
| Devitrification resistance | | Good | Good | Good | Good | Good | Good | Good |
| Combing properties | | Good | Good | Good | Good | Good | Good | Good |
| Feeling | Stickiness reduction | Good | Good | Good | Good | Good | Good | Good |
| | Smooth feeling | Very good | Very good | Very good | Very good | Very good | Very good | Very good |
| Surface roughness | Arithmetic mean roughness (μm) | 0.10 | 0.10 | 0.11 | 0.10 | 0.11 | 0.14 | 0.13 |
| | Ten-point surface roughness (μm) | 0.8 | 0.9 | 0.8 | 0.7 | 0.8 | 1.1 | 1.1 |
| Iron setting properties (180° C.) | Adhesion | Good | Good | Good | Good | Good | Good | Good |
| | Crimping/end breakage | Good | Good | Good | Good | Good | Good | Good |
| | Rod out | Good | Good | Good | Good | Good | Good | Good |
| | Holding properties | Good | Good | Good | Good | Good | Good | Good |
| Curl setting properties (110° C.) | | Good | Good | Good | Good | Good | Good | Good |

Examples 23 to 29

To a composition made of polyethylene terephthalate dried to have a moisture content of 100 ppm or less, a brominated epoxy flame retardant, and inorganic fine particles at a composition ratio shown in Table 9, 2 parts of a coloring polyester pellet PESM6100 BLACK (manufactured by Dainichiseika Color & Chemicals Mfg. Co., Ltd., carbon black content: 30%, polyester contained in the component (A)) was added, and the components were dry blended. The blend was fed into a twin-screw extruder and melt kneaded at 280° C. to form a pellet. Then, the pellet was dried to have a moisture content of 100 ppm or less. Next, the pellet was put into a melt spinning machine, and the molten polymer was spun through a spinneret having nozzle holes with a cross-section of FIGS. 8 and 9 at 280° C., air-cooled, and rolled up at a rate of 100 m/min to obtain a spun yarn. The resulting spun yarn was drawn in a hot water bath at 80° C. to prepare a yarn at a draw ratio of 4. The drawn yarn was rolled up around a heat roll heated to 200° C. at a rate of 30 m/min and heat-treated. Fiber treating agents shown in Table 10 were respectively attached to the yarn to obtain a polyester fiber (multifilament) having a monofilament size of about 70 dtex.

TABLE 9

| | Example | | | | | | |
|---|---|---|---|---|---|---|---|
| | 23 | 24 | 25 | 26 | 27 | 28 | 29 |
| EFG-85A*[1] | 100 | 100 | 100 | 100 | 100 | 100 | 100 |
| SR-T20000*[10] | 16 | 16 | 16 | 16 | 16 | | |
| YPB-43M*[11] | | | | | | 15 | 15 |
| PKP-53*[7] | 0.6 | 0.6 | 0.6 | 0.6 | 0.6 | | |

*[1] Polyethylene terephthalate, manufactured by Kanebo Gohsen, Ltd.
*[10] Terminal non-blocked brominated epoxy flame retardant, number average molecular weight: 30,000, manufactured by Sakamoto Yakuhin Kogyo Co., Ltd.
*[11] Terminal non-blocked brominated epoxy flame retardant, number average molecular weight: 40,000, manufactured by Tohto Kasei Co., Ltd.
*[7] Talc, manufactured by Fuji talc Industrial Co., Ltd.

As shown in Tables 8 and 10, it was confirmed that a fiber for artificial hair having excellent properties and quality balance can be obtained by modifying the fiber cross-section or using a specific fiber treating agent.

INDUSTRIAL APPLICABILITY

An object of the present invention is to provide a flame retardant polyester fiber for artificial hair in which problems of the prior art are solved and which maintains fiber properties such as heat resistance and strength and elongation possessed by a common polyester fiber, has excellent flame retardance, setting properties, drip resistance, transparence, devitrification resistance, stickiness reduction, and combing properties required for artificial hair, and has fiber luster controlled according to need.

Another object of the present invention is to provide a polyester fiber for artificial hair which maintains fiber properties such as heat resistance and strength and elongation possessed by a polyester fiber, improves defective curling properties of such a polyester fiber, and has excellent luster, feeling, and combing properties by using the above-described polyester fiber for artificial hair which has at least one modified cross-section, is a mixture with a fiber having a modified

TABLE 10

| | | Example | | | | | | |
|---|---|---|---|---|---|---|---|---|
| | | 23 | 24 | 25 | 26 | 27 | 28 | 29 |
| Nozzle shape | | Modified 1 | Modified 1 | Modified 1 | Modified 1 | Modified 1 | Modified 2 | Modified 2 |
| Size (dtex) | | 70 | 70 | 70 | 70 | 70 | 68 | 68 |
| Amount of fiber treating agents attached (% omf) | KWC-Q*[17] | 0.1 | 0.25 | 0.15 | | | 0.1 | |
| | KRE-103*[18] | 0.1 | | | | | 0.1 | |
| | KRE-102*[19] | | 0.2 | 0.1 | | | | |
| | KRE-15*[20] | | | | 0.2 | 0.1 | | 0.1 |
| | KRE-16*[21] | | | | 0.14 | 0.07 | | 0.07 |
| | KRE-17*[22] | | | | 0.06 | 0.03 | | 0.03 |
| Strength (cN/dtex) | | 2.5 | 2.5 | 2.5 | 2.5 | 2.5 | 2.4 | 2.4 |
| Elongation (%) | | 54 | 54 | 54 | 54 | 54 | 48 | 48 |
| Flame retardance | Flammability | Very good | Very good | Very good | Very good | Very good | Very good | Very good |
| | Drip resistance | Very good | Very good | Very good | Very good | Very good | Very good | Very good |
| Gloss | | Good | Good | Good | Good | Good | Very good | Very good |
| Transparence | | Good | Good | Good | Good | Good | Good | Good |
| Devitrification resistance | | Good | Good | Good | Good | Good | Good | Good |
| Combing properties | | Good | Good | Good | Good | Good | Good | Good |
| Feeling | Stickiness reduction | Good | Good | Good | Good | Good | Good | Good |
| | Smooth feeling | Good | Very good | Good | Very good | Good | Good | Good |
| Surface roughness | Arithmetic surface roughness (μm) | 0.10 | 0.10 | 0.10 | 0.10 | 0.10 | 0.14 | 0.14 |
| | Ten-point surface roughness (μm) | 0.8 | 0.8 | 0.8 | 0.8 | 0.8 | 1.1 | 1.1 |
| Iron setting properties (180° C.) | Adhesion | Good | Good | Good | Good | Good | Good | Good |
| | Crimping/end breakage | Good | Goo-d | Good | Good | Good | Good | Good |
| | Rod out | Good | Good | Good | Good | Good | Good | Good |
| | Holding properties | Good | Good | Good | Good | Good | Good | Good |
| Curl setting properties (110° C.) | | Good | Good | Good | Good | Good | Good | Good | cross-section, and has a mixing ratio of the fiber having a round cross-section to the fiber having a modified cross-section is 8:2 to 1:9.

The present invention further provides a flame retardant fiber for artificial hair which does not have reduced flame retardance as in the case where such a fiber is treated with a silicone fiber treating agent in order to improve smooth feeling and texture, for example; has slip feeling and combing properties the same as in the case where such a fiber is treated with a silicone oil agent for the same purpose; and has excellent flame retardance.

The invention claimed is:

1. A hair product comprising flame retardant polyester fiber and 60% or less of human hair, the fiber comprising 100 parts by weight of (A) a polyester made of one or more of polyalkylene terephthalate or copolymer polyester, which comprises polyalkylene terephthalate as a main component, and 5 to 30 parts by weight of (B) a brominated epoxy flame retardant having a repeating unit represented by

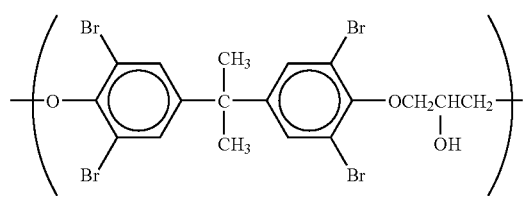

wherein the hair product is selected from a wig, a hair wig and a hair extension.

2. The hair product according to claim 1, wherein the component (B) is (B1) a brominated epoxy flame retardant having a number average molecular weight of 20,000 or more and is represented by the following general formula (1), and the fiber surface has minute projections

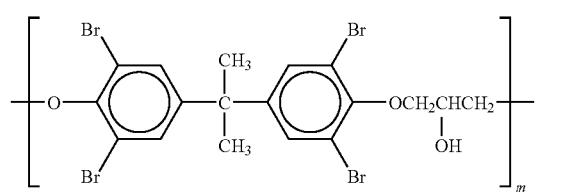

(wherein m represents 0 to 150).

3. The hair product according to claim 1, wherein the component (A) is a polyester made of at least one polymer selected from the group consisting of polyethylene terephthalate, polypropylene terephthalate, and polybutylene terephthalate.

4. The hair product according to claim 1 or 3, wherein the component (B) is at least one flame retardant selected from the group consisting of brominated epoxy flame retardants represented by the general formulas (2) to (4):

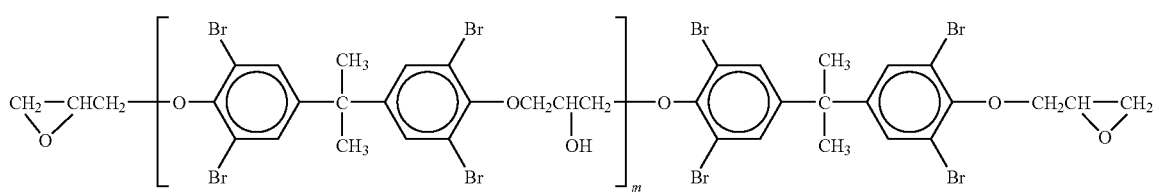

wherein m represents 0 to 29,

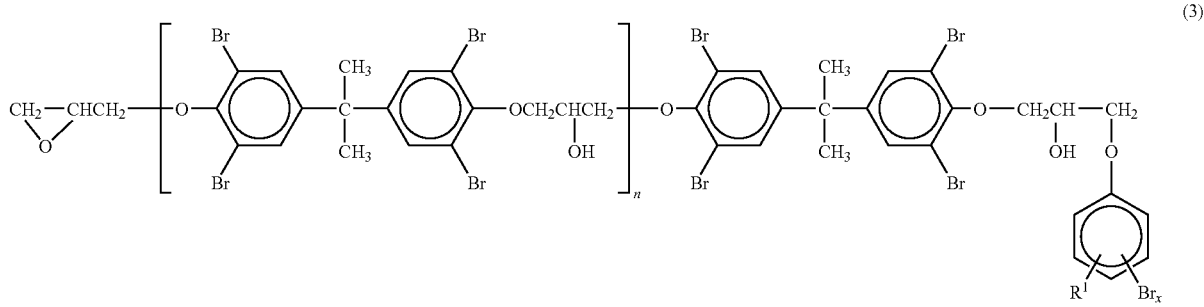

wherein $R^1$ represents a $C_{1-10}$ alkyl group, and n represents 0 to 100, and x represents 0 to 4,

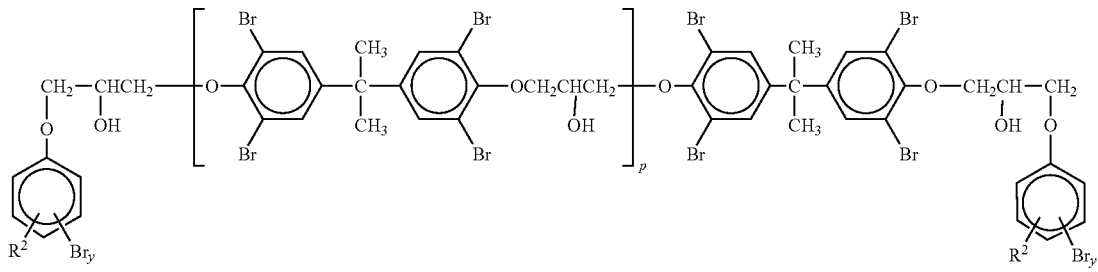

(4)

wherein R² represents a $C_{1-10}$ alkyl group, p represents 0 to 100, and y represents 0 to 4.

5. The hair product according to claim 1 or 2, wherein the component (B1) is at least one flame retardant selected from the group consisting of brominated epoxy flame retardants represented by the general formulas (5) to (7):

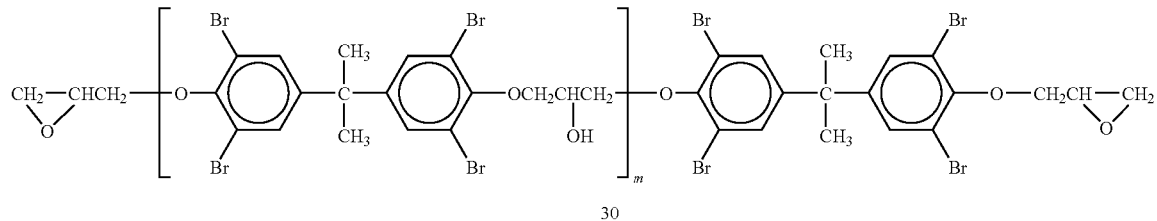

(5)

wherein m represents 30 to 150,

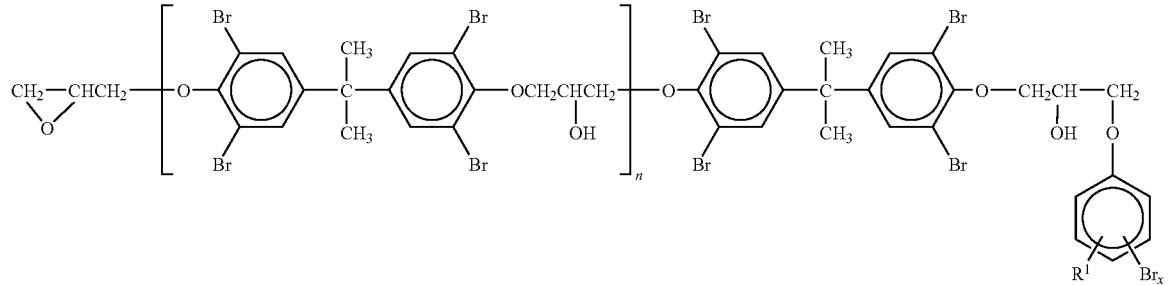

(6)

wherein R¹ represents a $C_{1-10}$ alkyl group, and n represents 30 to 100, and x represents 0 to 4,

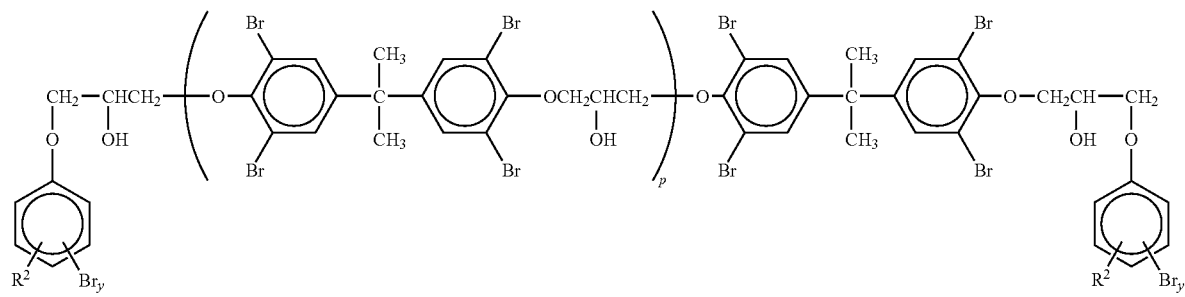

(7)

wherein R² represents a $C_{1-10}$ alkyl group, p represents 30 to 100, and y represents 0 to 4.

6. The hair product according to claim 2 or claim 3, wherein the projections on the fiber surface which obtained as Rz ten point average roughness have a range of 0.5 to 2.0 μm.

7. The hair product according to claim 1, 2 or 3, which is formed from a composition obtained by further mixing the components (A) and (B) with at least one member selected from the group consisting of organic fine particles (C) and inorganic fine particles (D), and has minute projections on the fiber surface.

8. The hair product according to claim 7, wherein the component (C) is at least one member selected from the group consisting of a polyarylate, polyamide, fluororesin, silicone resin, crosslinked acrylic resin, and crosslinked polystyrene.

9. The hair product according to claim 7, wherein the component (D) is at least one member selected from the group consisting of calcium carbonate, silicon oxide, titanium oxide, aluminium oxide, zinc oxide, talc, kaolin, montmorillonite, bentonite, and mica.

10. The hair product according to claim 1, 2, or 3, which has at least one modified cross-section selected from the group consisting of shapes of an ellipse, crossed circles, a cocoon, a potbelly, a dog bone, a ribbon, three to eight leaves, and a star.

11. The hair product according to claim 10, wherein the fiber cross-section has a shape with two or more circles or flat circles lapped or brought into contact with each other.

12. The hair product according to claim 10, wherein the fiber cross-section has a shape of three to eight leaves, and the fiber is a modified cross-section fiber having a degree of modification represented by the expression (1) of 1.1 to 8

Degree of modification=(Circumscribed circle diameter of monofilament cross-section)/(Inscribed circle diameter of monofilament cross-section)  (Expression 1).

13. The hair product according to claim 10, wherein the fiber cross-section has a flatness ratio of 1.2 to 4.

14. The hair product according to claim 10, wherein the flame retardant polyester fiber is a mixture of a fiber having a round cross-section with a fiber having at least one modified cross-section selected from the group consisting of shapes of an ellipse, crossed circles, a cocoon, a potbelly, a dog bone, a ribbon, three to eight leaves, and a star, wherein the mixing ratio of the fiber having a round cross-section to the fiber having a modified cross-section is 8:2 to 1:9.

15. The hair product according to claim 1, 2 or 3, further comprising (E) a hydrophilic fiber treating agent attached to the fiber.

16. The hair product according to claim 15, wherein the component (E) is at least one member selected from the group consisting of a polyether compound, fatty acid ester compound, organic amine, organic amide, organic fatty acid ester, organic amine salt, organic ammonium salt, organic pyridium salt, organic ammonium salt, organic pyridinium salt, organic picolinium salt, organic fatty acid salt, resinate, organic sulfonate, organic succinate, organic monosuccinate, organic carboxylate, organic sulfate, and organic phosphate.

17. The hair product according to claim 15, wherein the component (E) is at least one member selected from the group consisting of polyoxyalkylene alkyl ether, polyoxyalkylene alkenyl ether, and polyoxyalkylene aryl ether, and their random copolymer polyethers, polyoxyalkylene alkylaryl ether, polyoxyalkylene alkyl ester, polyoxyalkylene alkenyl ester, and polyoxyalkylene alkylaryl ester.

18. The hair product according to claim 15, wherein the component (E) is at least one member selected from the group consisting of an ethylene oxide-propylene oxide random copolymer polyether with molecular weight MW: 15,000 to 50,000, polyethylene oxide with molecular weight MW: 100 to 1,000, and polypropylene oxide with molecular weight MW: 100 to 1,000.

19. The hair product according to claim 18, wherein the component (E) is attached to the fiber at a weight ratio of 0.01% to 1%.

20. The hair product according to claim 1, 2 or 3, which is in the form of a non-crimped fiber.

21. The hair product according to claim 1, 2 or 3, wherein the fiber is spun dyed.

22. The hair product according to claim 1, 2 or 3, wherein the fiber has a monofilament size of 30 to 80 dtex.

23. The hair product according to claim 1, further comprising at least one of modacrylic fiber, polyvinyl chloride fiber and nylon fiber.

24. The hair product according to claim 1, wherein the hair product comprises at least 20 wt % of human hair.

* * * * *